United States Patent [19]
Mori et al.

[11] Patent Number: 5,321,617
[45] Date of Patent: Jun. 14, 1994

[54] SYSTEM FOR ACCOMMODATING SITTING ATTITUDE OF VEHICLE OCCUPANT

[75] Inventors: Takakazu Mori; Eiichi Hamada, both of Toyota; Kunio Nishiyama, Susono, all of Japan

[73] Assignee: Toyota Jidosha Kabushiki Kaisha, Toyota, Japan

[21] Appl. No.: 953,673

[22] Filed: Oct. 1, 1992

[30] Foreign Application Priority Data

Oct. 1, 1991 [JP] Japan .................................. 3-253230
Oct. 21, 1991 [JP] Japan .................................. 3-272867
Mar. 18, 1992 [JP] Japan .................................. 4-062419

[51] Int. Cl.$^5$ ........................................... G06F 15/20
[52] U.S. Cl. ................................ 364/424.05; 296/65.1
[58] Field of Search ...................... 364/424.05, 424.01; 296/63, 65.1; 244/122 R

[56] References Cited

U.S. PATENT DOCUMENTS 4,907,153 3/1990 Brodsky .......................... 364/424.05

FOREIGN PATENT DOCUMENTS

| | | |
|---|---|---|
| 57-84232 | 5/1982 | Japan . |
| 58-97040 | 7/1983 | Japan . |
| 3-237 | 1/1991 | Japan . |
| 3-21535 | 1/1991 | Japan . |

OTHER PUBLICATIONS

English abstract of Japanese Util. Model Application laid open application No. 58-97040, 1983.
English abstract of Japanese Util. Model Application laid open application No. 3-237, 1991.

Primary Examiner—Thomas G. Black
Assistant Examiner—Susan Wieland
Attorney, Agent, or Firm—Cushman, Darby & Cushman

[57] ABSTRACT

A controller for a vehicle seat for optimally controlling the posture of a vehicle seat. An amount of a running condition of the vehicle is detected, and a controlled variable for a posture of the seat for appropriately holding an inertial force acting on an occupant seated in the seat is determined in correspondence with the amount of the running condition of the vehicle detected. In addition, an amount of displacement of a posture of the vehicle is detected, and the posture of the seat is controlled on the basis of the controlled variable for the posture of the seat and the amount of displacement of the posture of the vehicle. Since the posture of the seat is controlled in correspondence with not only the running condition of the vehicle but postural displacement of the vehicle, the holding characteristic of the driver's seat improves and permits driving with a comfortable and more stable posture.

18 Claims, 24 Drawing Sheets

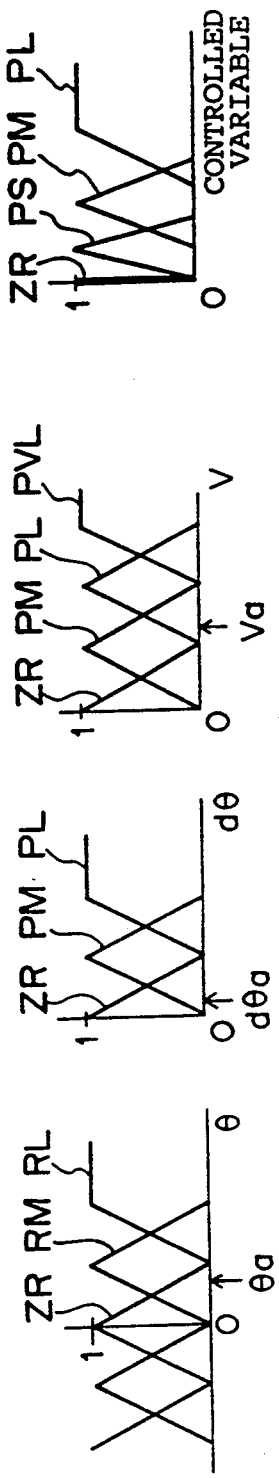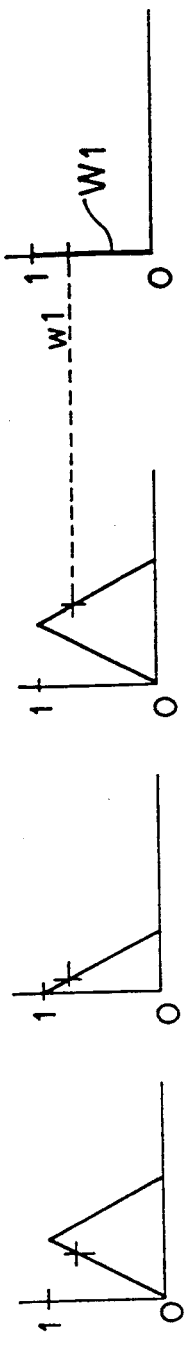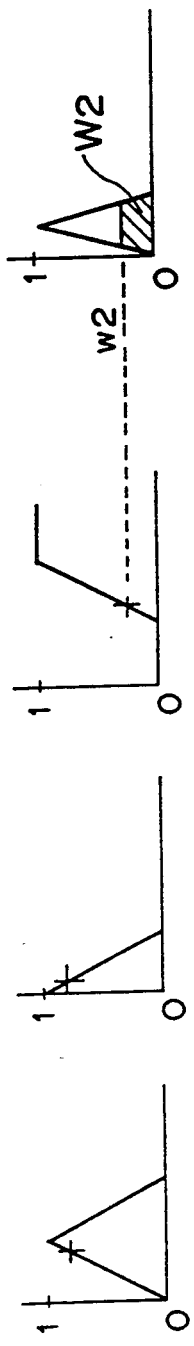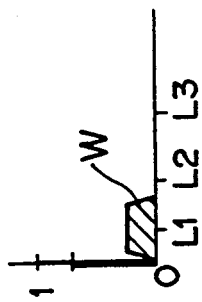
FIG. 9A
FIG. 9B
FIG. 9C
FIG. 9D

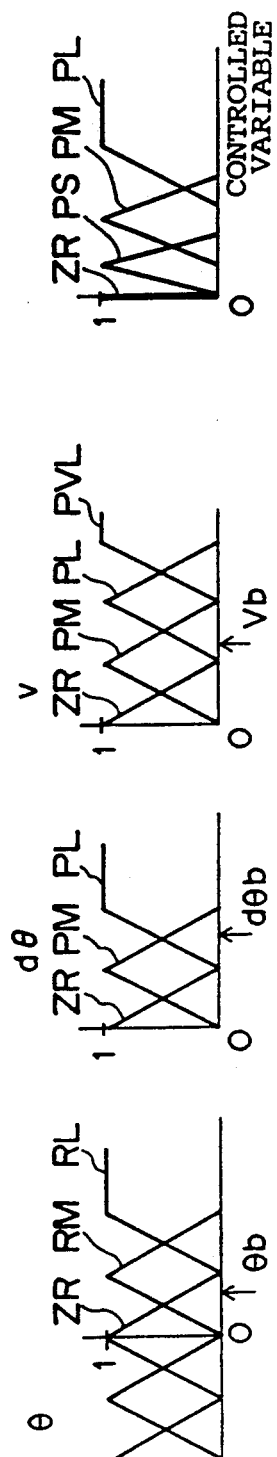
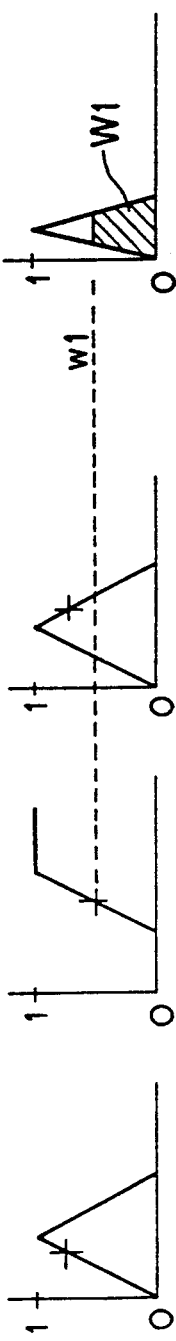
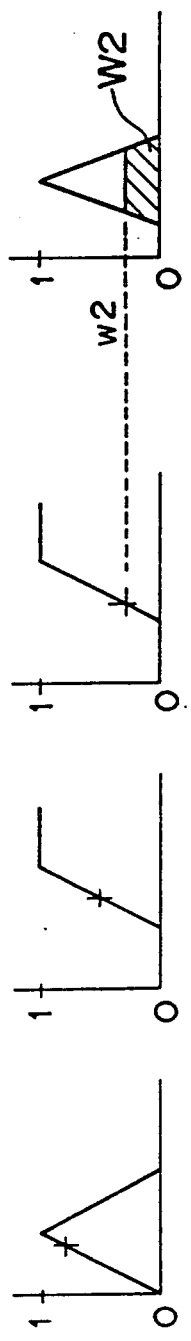
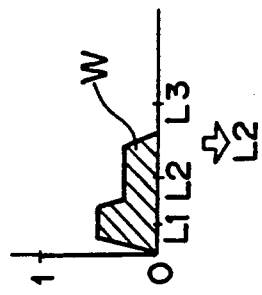
FIG. 10A
FIG. 10B
FIG. 10C
FIG. 10D

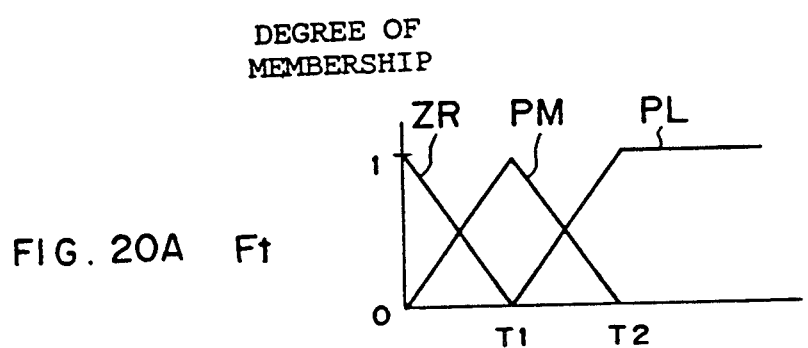
FIG. 20A Ft
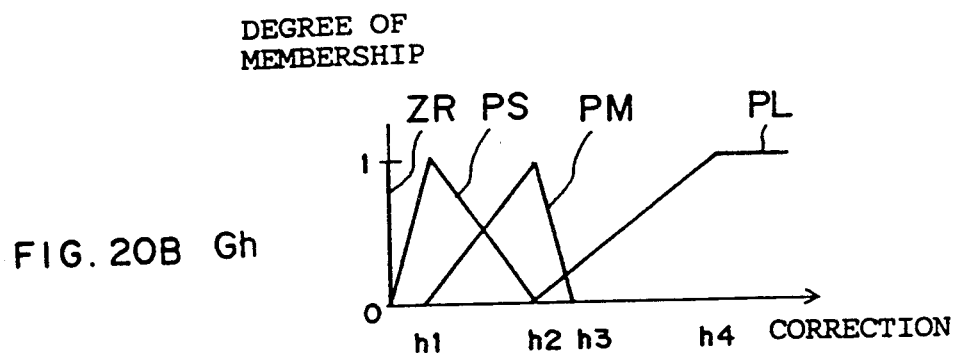
FIG. 20B Gh

SYSTEM FOR ACCOMMODATING SITTING ATTITUDE OF VEHICLE OCCUPANT

BACKGROUND OF THE INVENTION

1. Field of the Invention

The present invention relates to a system for accommodating a sitting attitude of a vehicle occupant. More particularly, the present invention relates to a system for securing a comfortable sitting attitude of a vehicle occupant by adjusting the sitting attitude in correspondence with an inertial force acting on a vehicle occupant during the running of a vehicle, or by adjusting the sitting attitude such that the occupant can hold with a comfortable posture the inertial force acting during the running of a vehicle.

2. Description of the Related Art

Conventionally, a vehicle is provided with seats for occupants to be seated in, and these seats are fixed to a vehicle body so that they do not move when the vehicle is running. Recently, high-speed running has become possible in conjunction with the improved performance of the vehicles, and maneuvering stability has improved substantially. With respect to vehicle seats, it has become possible to adjust their positions in conformity with the physique of the occupant, and improvements have been made in terms of the occupants' feeling of being seated in the seat. However, since the seats do not move during running, depending on a running condition of the vehicle, e.g., when the vehicle turns, an inertial force (centrifugal force) occurring during a turn has caused a slippage in the seated condition of the occupant, thereby imparting an uncomfortable feeling to the occupant. To overcome this problem, vehicle seats have been proposed in which the inertial force is detected by a sensor (an acceleration sensor, a vehicle speed sensor, a revolution sensor, or the like) during the running of the vehicle, and the seated condition of the occupant is adjusted by moving the seat on the basis of a detected value thereof, thereby to overcome the uncomfortable feeling (Japanese Patent Application Laid-Open No. 84232/1982 and Japanese Utility Model Application Laid-Open No. 97040/1983). These prior art techniques attempt to constantly maintain a comfortable seated condition by moving the seat in a transverse direction (i.e., in a direction perpendicular to the traveling direction of the vehicle, hereafter the same) by following a movement of the vehicle, e.g., the movement of the vehicle during a turn. In addition, there is another technique in which the posture of the seat is changed in the transverse direction by detecting the height of the vehicle (Japanese Utility Model Application Laid-Open No. 237/1991). Thus, the posture of the seat has hitherto been moved only in the transverse direction.

In the vehicle, however, a force acts on the suspension and the like in correspondence with the inertial force, with the result that the posture of the vehicle body changes. For this reason, even if the position of the seat is controlled in the transverse direction on the basis of the inertial force determined from the vehicle speed, the turning direction of the vehicle, and the like in the conventional manner, since a change in the posture of the vehicle occurs, there has been the problem that the seat cannot be controlled in conjunction with a change in the posture of the vehicle and to an optimum postural position suited to driving.

In addition, when the occupant moves passively after getting in the vehicle or the like, since there are cases where information obtained from the space sense, e.g., the sense of equilibrium, the visual sense, the positional sense, and the like, differs from information stored in the brain, so that the occupant can lapse into a condition inconsistent with a condition that can be estimated on the basis of his or her past experience stored in the brain. Hence, it is known that some drivers become carsick for the above-described reason.

Accordingly, even if the posture of the seat is controlled in correspondence with the running condition of the vehicle, there are cases where the information stored in the occupant's brain does not accord with the space sense resulting from the control of the posture of the seat, thereby possibly causing discomfort such as carsickness. Whether or not the discomfort such as carsickness occurs depends on the occupant (individual). If the posture of the seat is only controlled univocally in conjunction with a change in the posture of the vehicle, it is difficult to secure optimum postures for all the occupants, and such a measure does not overcome the discomfort of all the occupants.

Furthermore, when the running condition of the vehicle is maintained at the time of changing a lane during high-speed running or at the time of running on a rough road, a winding road, or the like, the angular velocity of the steering wheel is large, and the steering wheel is turned back clockwise or counterclockwise within a short period of time. In such a case, the movement of the vehicle does not coincide with the rotational angle of the steering wheel. Hence, even if the control of the seat posture is effected in correspondence with the rotational angle of the steering wheel, or in correspondence with the movement of the vehicle, the driver can possibly feel discomfort.

Moreover, at the time of starting (accelerating), braking (decelerating), changing a lane during high-speed running, and turning on a rough road, the direction of the inertial force changes substantially during a short period of time, so that the posture of the vehicle changes substantially in both the longitudinal and transverse directions of the vehicle. For this reason, it is necessary to effect control within a short period of time. In addition, if the control of the seat posture is effected with respect to the transverse direction only, a postural displacement in the longitudinal direction remains in the occupant. Hence, it is difficult to secure an optimum posture during driving, so that such a measure does not overcome the discomfort of the occupant.

SUMMARY OF THE INVENTION

The present invention has been devised in view of the above-circumstances, and it is an object of the present invention to provide a system for accommodating a sitting attitude of an occupant capable of effecting attitude adjustment which does not impart discomfort to the occupant.

To this end, in accordance with one aspect of the invention, there is provided a system for accommodating the sitting attitude of an occupant in accordance with a varied vehicle operating condition and vehicle attitude, comprising in combination: means for sensing values of the vehicle operating condition; means for sensing values of the vehicle attitude such as a value of rolling of the vehicle; means for computing values of motion in the sitting attitude in correspondence with the vehicle operating condition and vehicle attitude to determine an appropriate sitting attitude of the occupant; and means for adjusting the sitting attitude in accordance with the determined values of the appropriate sitting attitude.

In this aspect of the invention, the computing means preferably computes the values of motion in the sitting attitude, for offsetting an inertial force acting on the occupant seated in the seat.

In addition, the computing means may comprise comparing means for comparing the values of the vehicle attitude sensed with a predetermined value and correcting means for correcting a controlled variable for the sitting attitude on the basis of a result of comparison by the comparing means, and the adjusting means may adjust the sitting attitude on the basis of the controlled variable corrected.

In this aspect of the invention, the adjusting means preferably inclines the seat in a direction in which the vehicle turns, on the basis of the determined values of the appropriate sitting attitude. Specifically, the adjusting means changes a degree of inclination of the seat in correspondence with a steering angle, an angular velocity of steering, and a vehicle speed.

Further, the adjusting means preferably raises or lowers at least one of a front side and a rear side of the seat in correspondence with a condition of acceleration or deceleration of the vehicle. Specifically, the adjusting means changes a degree of raising or lowering at least one of the front side and the rear side of the seat in correspondence with a vehicle speed and the acceleration or deceleration of the vehicle.

In accordance with another aspect of the invention, there is provided a system for accommodating the sitting attitudes of occupants in accordance with a varied vehicle operating condition and vehicle attitude, comprising in combination: means for sensing values of the vehicle operating condition; means for computing values of motion in the sitting attitude in correspondence with the vehicle operating condition to determine an appropriate sitting attitude with respect to each of seats in which occupants are seated; and means for adjusting the sitting attitude in accordance with the determined values of the appropriate sitting attitude.

In accordance with this aspect of the invention, the system may further comprise: means for sensing the values of the vehicle attitude, wherein the adjusting means adjusts the sitting attitude on the basis of the vehicle operating condition and the vehicle attitude.

The computing means may include means for calculating a controlled variable for the sitting attitude, which comprises a storage means for storing a plurality of values of a corrected variable for correcting the controlled variable for the sitting attitude, and selecting means for selecting an optimum value of the corrected variable from the storage means, and computes the controlled variable for the sitting attitude with respect to each of the seats in which occupants are seated, on the basis of the values of the vehicle attitude sensed and the value of the corrected variable selected.

In this aspect of the invention, the seats in which the occupants are seated are preferably two seats including a driver's seat and a passenger's seat, and the computing means determines the appropriate sitting attitudes whose values differ with respect to the respective seats.

The computing means may determine the appropriate sitting attitude in such a manner that the controlled variable for the sitting attitude of the passenger becomes greater than the controlled variable for the sitting attitude of the driver when a right-steering-wheel vehicle turns, and determines the controlled variable for the sitting attitude in such a manner that the the opposite is true when a left-steering-wheel vehicle turns.

The computing means may comprise comparing means for comparing the values of the vehicle attitude with a predetermined value and correcting means for correcting the controlled variable for the sitting attitude on the basis of a result of comparison by the comparing means, and the adjusting means adjusts the sitting attitude on the basis of the controlled variable for the sitting attitude corrected.

The computing means preferably corrects the controlled variable for the sitting attitude of each of the seats in a case where the values of the vehicle attitude sensed has exceeded the predetermined value.

In accordance with still another aspect of the invention, there is provided a system for accommodating the sitting attitude of an occupant in accordance with a varied vehicle operating condition and vehicle attitude, comprising in combination: means for sensing a steering condition of a vehicle and values of the vehicle attitude; means for computing values of motion in the sitting attitude for appropriately holding an inertial force acting on the occupant seated in the seat in correspondence with the values of the vehicle attitude sensed; correcting means for correcting the values of motion in the sitting attitude in correspondence with the steering condition of the vehicle; and adjusting means for adjusting the sitting attitude on the basis of the controlled variable for the sitting attitude corrected by the correcting means.

In this aspect of the invention, the correcting means preferably corrects the values of motion in the sitting attitude to a predetermined value or below. Specifically, the correcting means preferably corrects the values of motion in the sitting attitude in correspondence with an angular velocity of a steering wheel and a steering period. More specifically, the correcting means preferably corrects the values of motion in the sitting attitude to a predetermined value or less when an angular velocity of a steering wheel is at a predetermined value or more and a steering period is at a predetermined value or less, or when a yaw rate is at a predetermined value or more and a steering period is at a predetermined value or less.

In accordance with a first embodiment of the invention, there is a provided a controller for a vehicle seat, comprising: means for detecting an amount of a running condition of a vehicle; means for calculating a controlled variable for a posture of the seat for appropriately holding an inertial force acting on an occupant seated in the seat in correspondence with the amount of the running condition of the vehicle detected; means for detecting an amount of displacement of a posture of a vehicle; and control means for controlling the posture of the seat on the basis of the controlled variable for the posture of the seat and the amount of displacement of the posture of the vehicle.

In accordance with this embodiment of the invention, a means for detecting an amount of a running condition of a vehicle is provided. It is possible to use a physical amount such as the vehicle speed, acceleration, a rotational angle of the steering wheel of the vehicle, and the angular velocity of the rotation of the steering wheel as the running condition of the vehicle. By detecting at least one of these physical amounts, it is possible to specify the amount of the running condition of the vehicle. The means for calculating a controlled variable for a posture calculates a controlled variable for a posture for, for instance, offsetting an inertial force, for appropriately holding the inertial force acting on the occupant seated in the seat in correspondence with the amount of the running condition of the vehicle detected. The means for detecting an amount of displacement of a posture of a vehicle detects an amount of displacement of the posture of the vehicle. The control means controls the posture of the seat on the basis of the controlled variable for the posture of the seat detected by the calculating means and the amount of displacement of the posture of the vehicle. The amount of displacement of the posture of the vehicle can be detected by detecting the displacement of the suspension.

In this embodiment of the invention, if a controlled variable for a seat for offsetting the inertial force is determined in advance to stabilize the posture of the seat at an early stage, and if the controlled variable for the seat is corrected in correspondence with the amount of displacement of the vehicle in conjunction with the postural displacement thereof, even when an inertial force acts due to the operation of the steering wheel and the like and the postural displacement of the vehicle increases in correspondence with the inertial force, control is effected by taking into consideration not only the controlled variable for the seat posture corresponding to the inertial force but a change in the posture of the vehicle. As a result, it is possible to secure an optimum driving posture without being affected by the spring characteristic of the vehicle.

As described above, in accordance with the first embodiment of the invention, the displacement of the posture of the seated occupant resulting from the inertial force during running is adjusted by changing the position of the seat in correspondence with the inertial force, and the position of the seat is adjusted by detecting the displacement of the vehicle. Hence, it is possible to obtain an advantage in that the holding characteristic of the driver's seat improves, thereby permitting driving with a more stable posture.

To attain the above-described object, in accordance with a second embodiment of the invention, there is provided a controller for vehicle seats, comprising: means for detecting an amount of a running condition of a vehicle; means for calculating a controlled variable for a posture of the seat for appropriately holding an inertial force acting on an occupant seated in the seat with respect to each of seats in which occupants are seated, in correspondence with the amount of the running condition of the vehicle detected; means for detecting an amount of displacement of a posture of the vehicle; and control means for controlling the posture of each of the seats on the basis of the controlled variable for the posture of the seat determined by the means for calculating a controlled variable for a posture.

The means for calculating a controlled variable for a posture calculates a controlled variable for each of seats in which occupants are seated, in correspondence with an inertial force acting on the occupants seated in the seats in correspondence with the amount of the running condition of the vehicle detected. The control means controls the posture of each of the seats on the basis of the controlled variable for the posture of the seat determined by the calculating means for calculating a controlled variable for a posture. Accordingly, since the seats in which the occupants are seated are respectively controlled in correspondence with the inertial forces acting on the occupants seated, the controller for vehicle seats is capable of controlling the respective seats without increasing the discomfort which is otherwise felt by the occupants.

In this embodiment of the invention, the controller for vehicle seats may further comprise means for detecting an amount of displacement of a posture of the vehicle and correcting means for correcting the controlled variable for a posture of the seat on the basis of the amount of displacement of the posture of the vehicle detected. In this case, the amount of postural displacement of the vehicle is detected by the means for detecting an amount of displacement of a posture of the vehicle. The amount of postural displacement of the vehicle can be detected by detecting a displacement of the suspension, for example. The controlled variable for a posture of each of the seats is corrected by the correcting means on the basis of the amount of displacement of the vehicle posture thus detected. Thus, since the controlled variable for the seat is determined in correspondence with the inertial force, and the controlled variable for each of the seats is corrected in correspondence with the displacement of the vehicle when the vehicle posture undergoes a displacement, the posture of each of the seats is corrected in such a manner that each seat is located at an appropriate position in correspondence with the inertial force due to a steering operation and the like and a displacement in the vehicle posture. Hence, it is possible to control the seats without increasing the discomfort which is otherwise felt by the occupants.

In addition, the aforementioned correcting means may comprise storage means for storing a plurality of values of a corrected variable for correcting the controlled variable for the posture of the seat and selecting means for selecting an optimum value of the corrected variable from said storage means, and the controlled variable for the posture may be corrected by using the value of the corrected variable selected by the selecting means.

In addition, in a case where the amount of displacement of the posture of the vehicle detected has exceeded a predetermined value, the controlled variable for the posture of each of the seats may be corrected by the correcting means.

The controlled variable for the posture of each of the seats is thus corrected on the basis of the amount of displacement of the vehicle when the amount of displacement of the posture of the vehicle has exceeded the predetermined value. Hence, the seats can be controlled to optimum postures even if the optimum postures of the seats change due to displacement of the vehicle resulting from the running condition of the vehicle when an attempt is made to control the postures of the seats to optimum postures on the basis of the amount of the running condition of the vehicle.

As described above, in accordance with this embodiment of the invention, the posture of each seat can be changed to an optimum seat position in correspondence with the inertial force acting on each seated occupant during running. Hence, it is possible to reduce the amount of discordance between information stored in the occupant's brain and information obtained from the running condition of the vehicle, thereby making it possible to secure optimum seat postures with controlled variables for the seats which are in conformity with the occupants' feelings.

To attain the above-described object, in accordance with a third embodiment of the invention, there is provided a controller for a vehicle seat, comprising: means for detecting a steering condition of a vehicle and an amount of a running condition of the vehicle; means for calculating a controlled variable for a posture for appropriately holding an inertial force acting on an occupant seated in the seat in correspondence with the amount of the running condition of the vehicle detected; correcting means for correcting the controlled variable in correspondence with the steering condition of the vehicle; and control means for controlling the posture of the seat on the basis of the controlled variable for the posture of the seat determined by the means for calculating a controlled variable for a posture.

In this embodiment of the invention, the steering condition of the vehicle (a turning condition, a steering period, and the like) and the running condition of the vehicle are detected by the detecting means. As the steering condition of the vehicle, it is possible to use an angular velocity of the steering wheel or a yaw rate. As the amount of the running condition of the vehicle, it is possible to use a physical amount such as the vehicle speed, acceleration, the rotational angle of the steering wheel, a yaw angle, and a yaw rate. By detecting at least one of these physical amounts, the running condition of the vehicle can be specified. The means for calculating a controlled variable for a posture determines a controlled variable for a posture for appropriately holding an inertial force acting on the occupant seated in the seat in correspondence with the running condition of the vehicle detected. The control means controls the posture of the seat on the basis of the controlled variable for the posture of the seat determined by the controlled-variable calculating means. The correcting means corrects the controlled variable to, for instance, a predetermined value or less in correspondence with the steering condition of the vehicle (steering condition, steering period, etc.). For instance, the angular velocity of the steering wheel is at a predetermined value or more and the steering period is at a predetermined value or less, or when the yaw rate is at a predetermined or more and the steering period is at a predetermined value or less. For instance, when the steering wheel is operated at the time of making a lane change during high-speed running or running on a rough road, the angular velocity of the steering wheel is large, and the steering wheel is turned back clockwise or counterclockwise within a short period of time. Accordingly, there is a time lag in the substantial motion of the vehicle with respect to the rotational angle of the steering wheel, so that the motion of the vehicle does not coincide with the rotational angle of the steering wheel. In this case, by setting the controlled variable by the control means to a predetermined value or less, i.e., by suspending or restricting the control, it is possible to prevent a swinging back in which, as in the case of postural control of the seat in correspondence with the rotational angle of the steering wheel, the vehicle body is displaced to a state corresponding to the rotational angle of the steering wheel after control is effected for changing the seat posture with the rotational angle of the steering wheel and the movement of the vehicle body remaining in discordance. As a result, the occupant is prevented from feeling discomfort.

As described above, in accordance with this embodiment of the invention, since the controlled variable for the seat is corrected to a predetermined value or less in correspondence with, for instance, the turning condition of the vehicle and the steering period when the displacement of the posture of the seated occupant, resulting from the inertial force during the running of the vehicle, is adjusted, there is an advantage in that the posture can be maintained in a comfortable condition without causing discomfort to the occupant.

The other objects, features and advantages of the present invention will become more apparent from the following detailed description of the invention when read in conjunction with the accompanying drawings.

BRIEF DESCRIPTION OF THE DRAWINGS

FIG. 9A is a diagram illustrating the membership functions;

FIGS. 9B and 9C are image diagrams illustrating a fuzzy inference process;

FIG. 9D is an image diagram illustrating a result of fuzzy inference;

FIG. 10A is a diagram illustrating the membership functions;

FIGS. 10B and 10C are image diagrams illustrating the fuzzy inference process;

FIG. 10D is an image diagram illustrating a result of fuzzy inference;

FIGS. 20A and 20B are diagrams illustrating the membership functions of a time during which the steering wheel periodically passes and of a corrected variable for control;

DESCRIPTION OF THE PREFERRED EMBODIMENTS

Referring now to the accompanying drawings, a detailed description will be given of a first embodiment of the present invention. In this embodiment, the present invention is applied to a case where the posture of a driver's seat of an automobile is controlled by making use of fuzzy inference.

Figure 1:
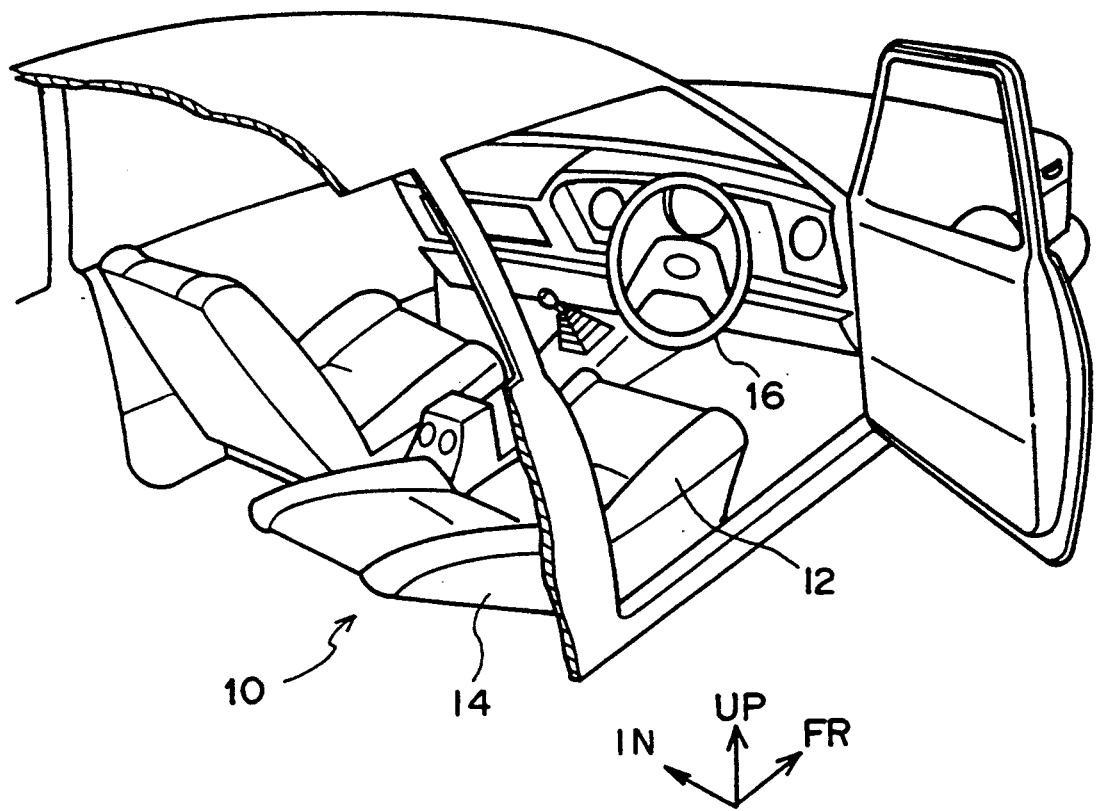
FIG. 1 is a perspective view illustrating a vehicle which can be used in first and third embodiments of the present invention.

As shown in FIG. 1, a seat 10 is provided in a vehicle compartment. As is known, this seat 10 has a seat cushion 12 and a seatback 14. It should be noted that, in the drawings, reference numeral 16 denotes a steering wheel; an arrow FR, a forward direction of the vehicle; an arrow IN, an inward direction as viewed in the transverse direction of the vehicle; and an arrow UP, an upward direction of the vehicle.

Figure 2:
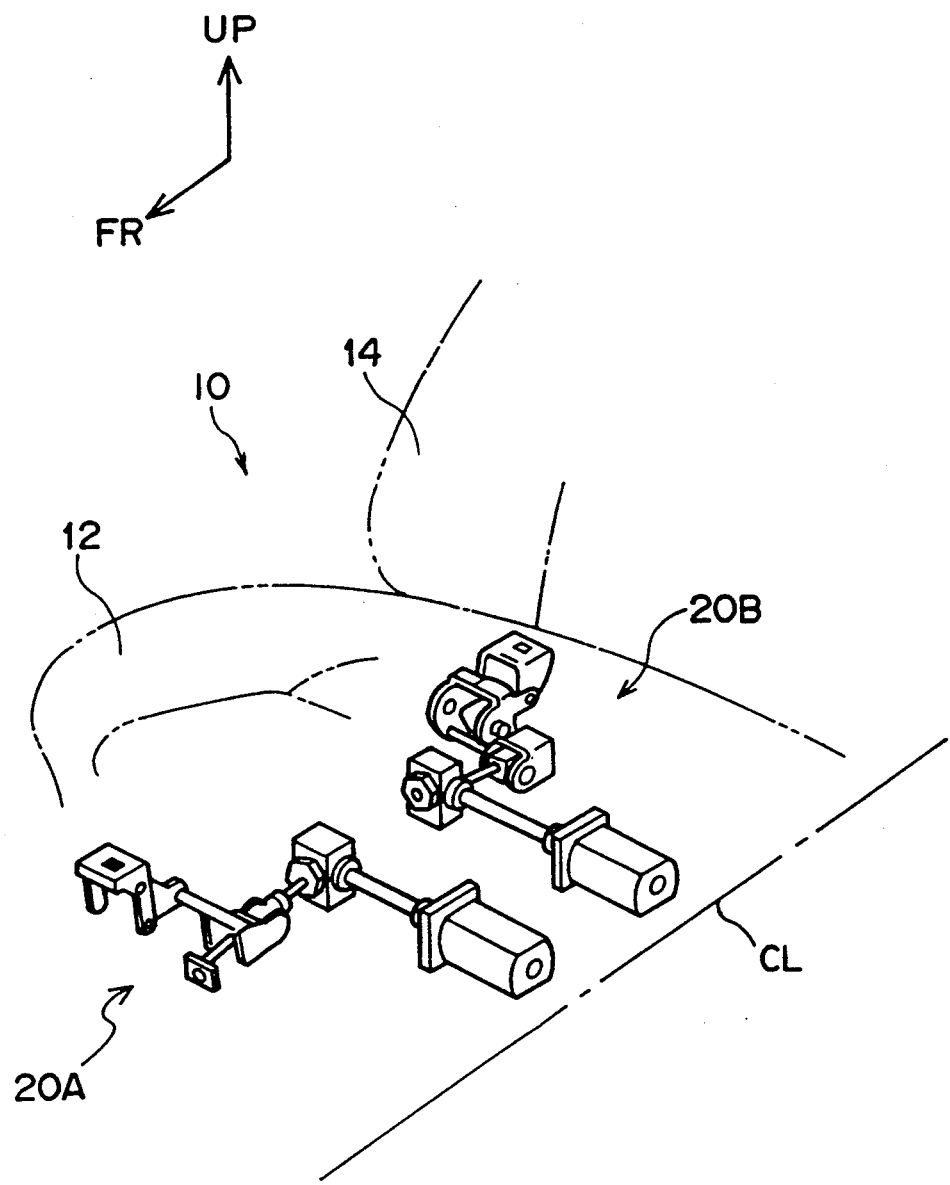
FIG. 2 is a perspective view, taken from the diagonally forward direction, of a seat in accordance with the embodiments of the present invention.

As shown in FIG. 2, a seat posture driving unit 20A is disposed under the seat cushion 12 on the forward right-hand side thereof, while a seat posture driving unit 20B is disposed under the seat cushion 12 on the rearward right-hand side thereof. Meanwhile, although not shown in FIG. 2, a seat posture driving unit 20C having the same arrangement as the seat posture driving unit 20A is disposed under the seat cushion 12 on the forward left-hand side thereof symmetrically about a center line CL. Also, a seat posture driving unit 20D having the same arrangement as the seat posture driving unit 20B is disposed under the seat cushion 12 on the rearward left-hand side thereof.

Figure 3A:
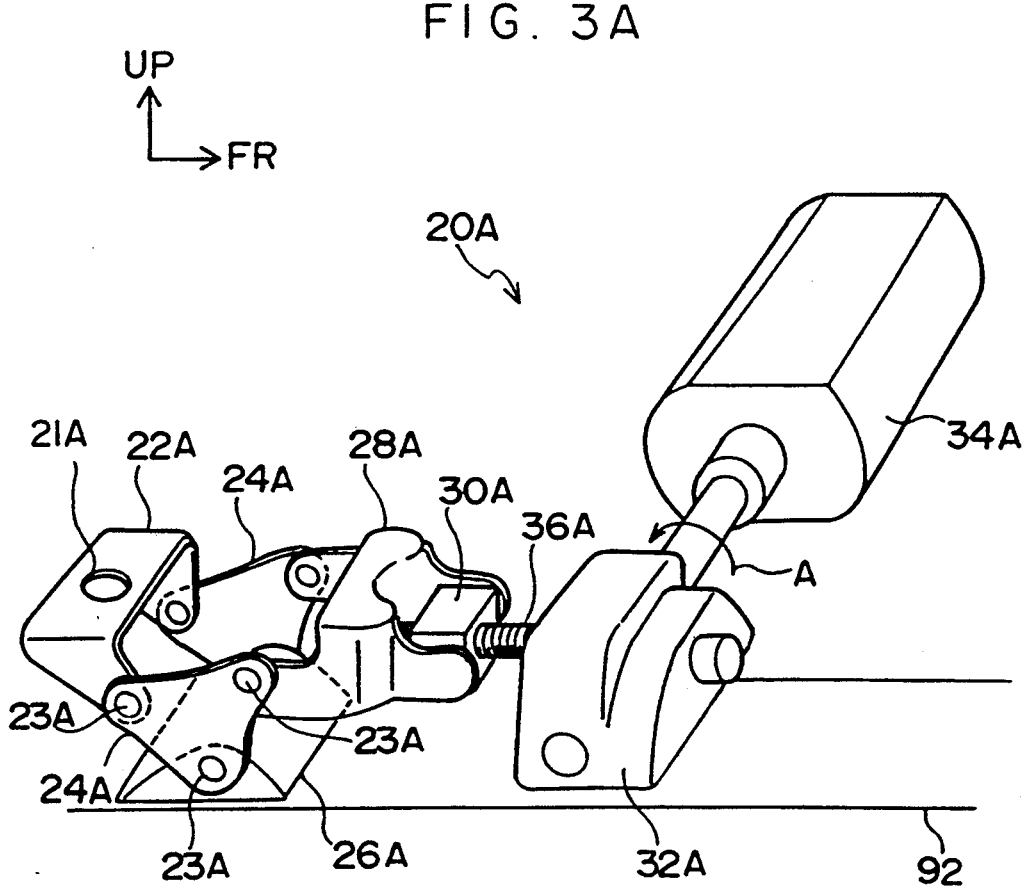
FIG. 3A is a schematic perspective view of a seat posture driving unit in accordance with the embodiments.
Figure 3B:
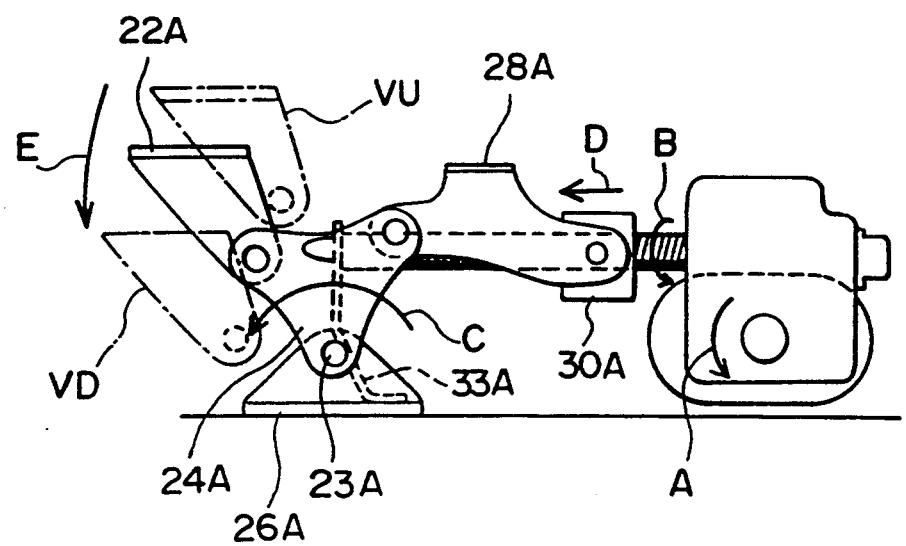
FIG. 3B is a side elevational view of FIG. 3A.

Referring now to FIGS. 3A and 3B, a description will be given of a schematic structure and operation of the seat posture driving unit 20A.

The seat posture driving unit 20A has a support 22A, a pair of flanges 24A, a stay 26A, a moving block 28A, a nut portion 30A, a housing 32A, a screw 36A, and a motor 34A.

The support 22A is bent with a U-shaped cross section, and a through hole is provided in the vicinity of a distal end of each of its bent portions bent downwardly in such a manner as to be substantially parallel with each other. A through hole 21A is also provided in an elongated flat portion which is continuous with these bent portions. The support 22A can be secured to the underside of the seat cushion 12 by means of a bolt which is inserted through the through hole 21A.

The stay 26A has a U-shaped cross section, and a through hole is provided in the vicinity of a distal end of each of its bent portions bent upwardly in such a manner as to be substantially parallel with each other. An unillustrated through hole is also provided in an elongated flat portion which is continuous with these bent portions. The stay 26A can be secured to a rail 92 fixed to an unillustrated chassis, by means of a bolt which is inserted through this through hole.

Each of the flanges 24A is formed in a substantially triangular plate-like configuration, and a total of three through holes are provided in respective apex portions thereof. The bent portions of the support 22A and the bent portions of the stay 26A are coupled with each other via these flanges 24A. Specifically, the coupling is provided as, on each side of the components to be assembled, a rivet 23A is axially secured through a first one of the through holes in the flange 24A and the through hole in the stay 26A, and another rivet 23A is axially secured through a second one of the through holes in the flange 24A and the through hole in the support 22A.

On each side the components to be assembled, still another rivet 23A is axially secured by being passed through a third one of the holes in the flange 24A and a through hole provided in each of a pair of plate-like distal end portions of the moving block 28A. As a result, the flanges 24A and the moving block 28A are coupled with each other. The nut portion 30A is provided on a side of the moving block 28A remote from the side thereof with which the flanges 24A are coupled. The screw 36A is threadedly engaged with this nut portion 30A.

One end of the screw 36A is rotatably fixed to the housing 32A, and the other end thereof is rotatably fixed to a holding member 33A shown in FIG. 3B. Housing 32A incorporates a worm gear and a worm wheel (neither are shown), and a rotating shaft of the motor 34A and the screw 36A are fixed to rotating shafts of the worm gear and the worm wheel, respectively. The rotation of the motor 34A is transmitted to the screw 36A via the worm gear and the worm wheel. It should be noted that the underside of the housing 32A is secured to the rail 92.

Figure 7:
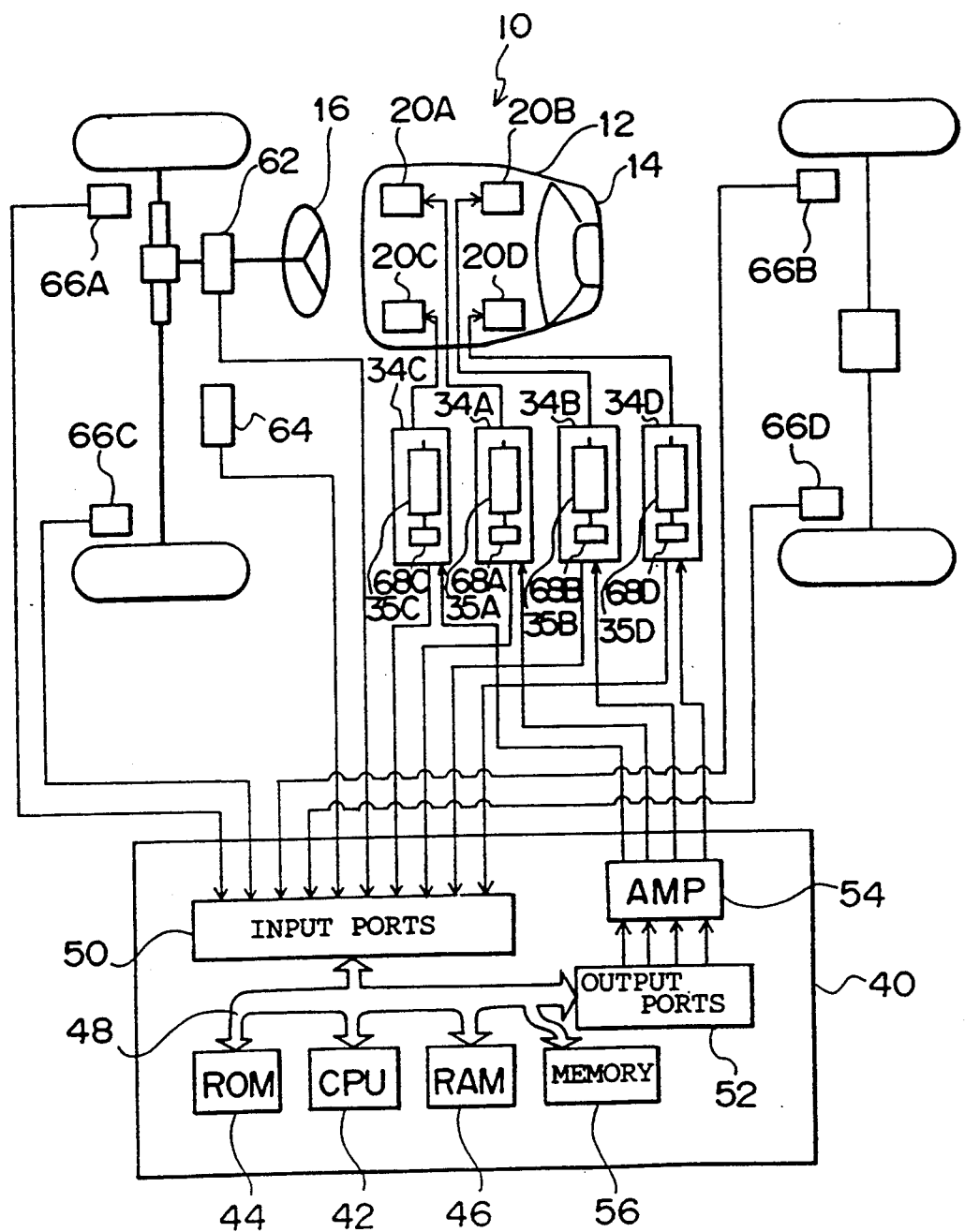
FIG. 7 is a block diagram of a configuration of a controller in accordance with the first and third embodiments.

The motor 34A is connected to a controller 40 (FIG. 7), and rotates in response to a signal from the controller 40. Motor 34A comprises a rotatively driving unit 35A for rotatively driving the screw 36A via the worm gear and the worm wheel, as well as an encoder 68A for detecting the rotation of a rotating shaft of the rotatively driving unit 35A (FIG. 7). The encoder 68A is attached to the rotating shaft of the rotatively driving unit 35A, and outputs a signal corresponding to the rotational angle of the rotatively driving unit 35A. It should be noted that a pulse motor which can be subjected to open control may be used without providing the encoder 68A.

According to the above-described seat posture driving unit 20A, as the rotating shaft of the rotatively driving unit 35A of the motor 34A is rotated in the direction of arrow A in FIG. 3B (counterclockwise), the rotation of the motor 34A is transmitted to the screw 36A via the worm gear and the worm wheel in the housing 32A, thereby causing the screw 36A to rotate in the direction of arrow B in FIG. 3B. Since one end of the screw 36A is rotatably fixed to the housing 32A, the rotation of the screw 36A causes the nut portion 30A to move in the direction of arrow D in FIG. 3B. Since the nut portion 30A is fixed to the moving block 38A, the distal end of the moving block 28A moves in the direction of arrow D in FIG. 3B. Since the moving block 28A is coupled with the stay 26A secured to the rail 92, the flanges 24A rotate in the direction of arrow C in FIG. 3B about the rivets 23A coupling the flanges 24A and the stay 26A. Hence, the support 22A fixed to the flanges 24A moves in the direction of arrow E in FIG. 3B, and moves to the position of a phantom line VD.

As the support 22A moves vertically, as described above, the seat 10 can be moved vertically.

It should be noted that since the seat posture driving unit 20B, the seat posture driving unit 20C, and the seat posture driving unit 20D are arranged in the same manner as the seat posture driving unit 20A, a description thereof will be omitted.

Figure 4:
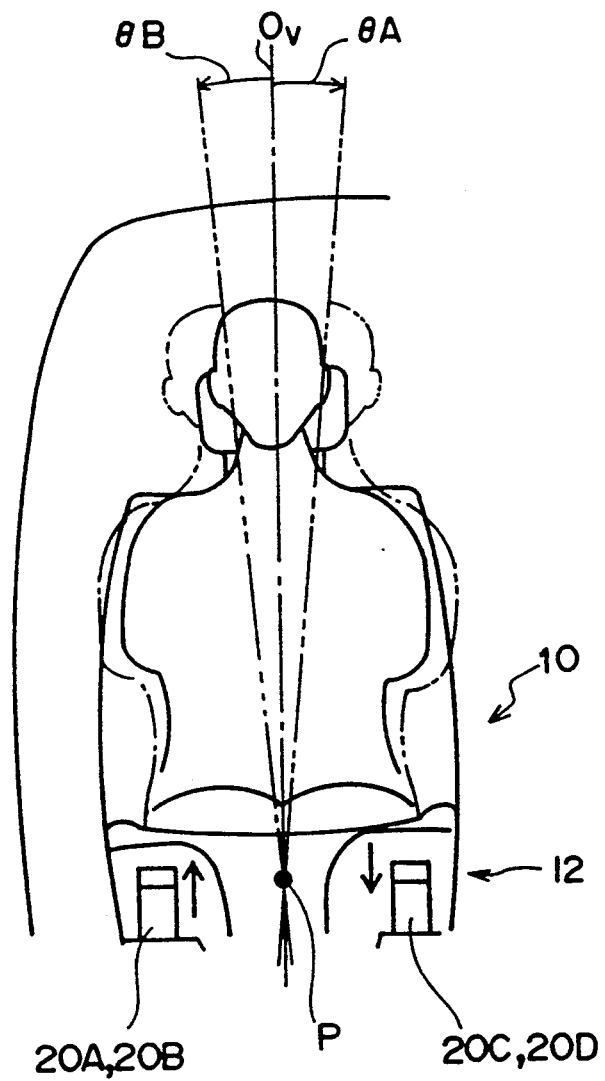
FIG. 4 is an image view illustrating a condition in which the seat is swung in the transverse direction of the vehicle.

Accordingly, as shown in FIG. 4, if the position (reference position) of the seat 10 in a steady running condition or in a stopped condition of the vehicle is assumed to be $O_v$ (a vertical line passing through a hip point P), and if supports 22A, 22B of the seat posture driving units 20A, 20B are raised and supports 22C, 22D of the seat posture driving units 20C, 20D are lowered, the seat 10 rotates through a predetermined angle in the direction of arrow $\theta A$ in FIG. 4 from the reference position $O_v$ with the hip point P as a center. Meanwhile, if, conversely, the supports 22A, 22B of the seat posture driving units 20A, 20B are lowered and the supports 22C, 22D of the seat posture driving units 20C, 20D are raised, the seat 10 rotates through a predetermined angle in the direction of arrow $\theta B$ in FIG. 4 from the reference position $O_v$ with the hip point P as a center.

Figure 5:
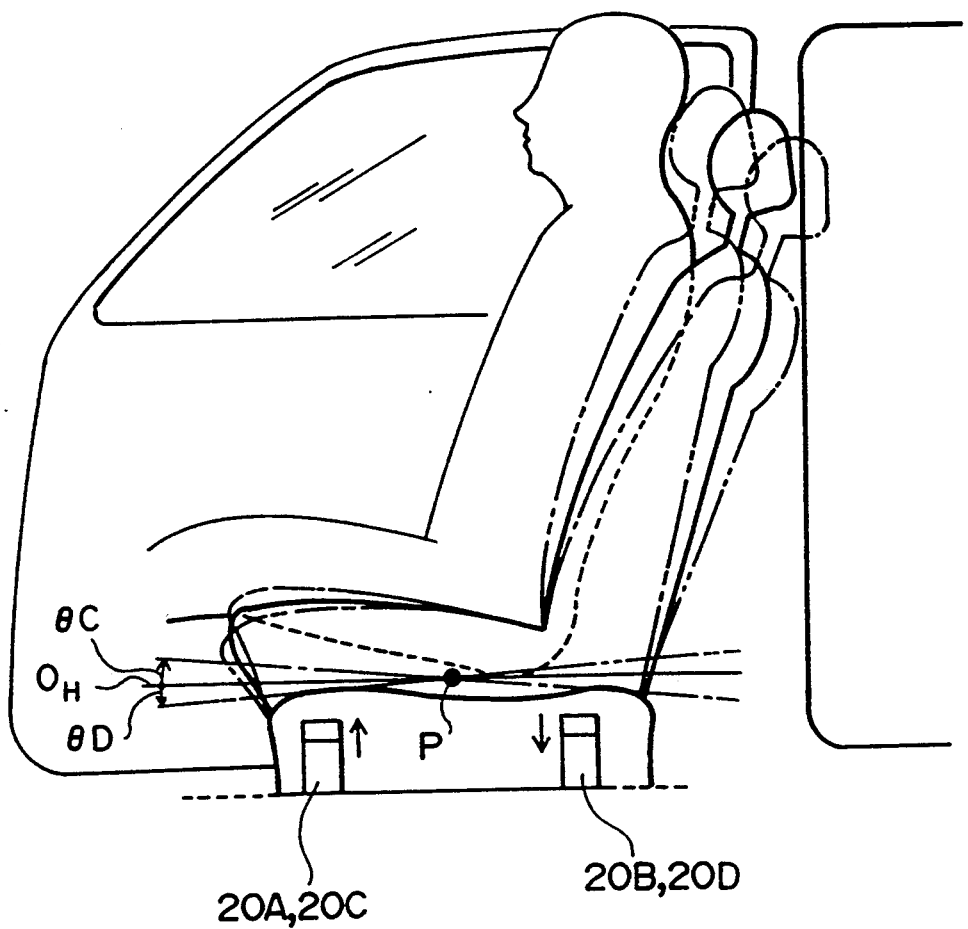
FIG. 5 is an image view illustrating a condition in which the seat is swung in the longitudinal direction of the vehicle.

In addition, as shown in FIG. 5, if the supports 22A, 22C of the seat posture driving units 20A, 20C are raised and the supports 22B, 22D of the seat posture driving units 20B, 20D are lowered, the seat 10 rotates through a predetermined angle in the direction of arrow $\theta C$ in FIG. 5 from a reference position $O_H$ (a horizontal line passing through the hip point P) with the hip point P as a center. Meanwhile, if the supports 22A, 22C of the seat posture driving units 20A, 20C are lowered and the supports 22B, 22D of the seat posture driving units 20B, 20D are raised, the seat 10 rotates through a predetermined angle in the direction of arrow $\theta D$ in FIG. 5 from the reference position $O_H$ with the hip point P as a center.

Here, Table 1 below shows an example of relationships between the motors which are rotated to control the posture of the seat 10 and the states of control, including control during a turning of the vehicle (roll control), control during an acceleration (squat control), and control during a deceleration (dive control).

TABLE 1

Figure 6:
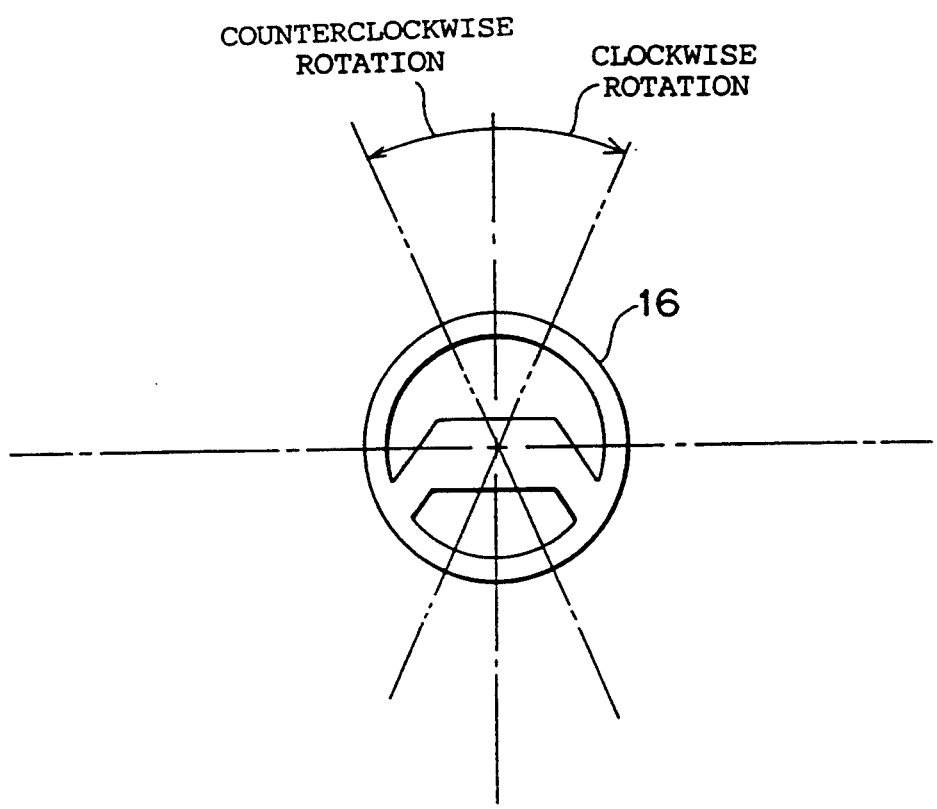
FIG. 6 is a diagram illustrating the rotating directions of a steering wheel.

| Motor | | Type of Control | | | |
|---|---|---|---|---|---|
| | | Roll | | Squat | Dive |
| | | $\theta = R$ | $\theta = L$ | | |
| Motor | 20A | 0 | 1 | 0 | 1 |
| | 20C | 1 | 0 | 0 | 1 |
| | 20B | 0 | 1 | 1 | 0 |
| | 20D | 1 | 0 | 1 | 0 | where,
0: rotates the motor counterclockwise
1: rotates the motor clockwise
$\theta = R$: rotates the steering wheel 16 clockwise (see FIG. 6)
$\theta = L$: rotates the steering wheel 16 counter-clockwise (see FIG. 6)

It should be noted that the aforementioned rotation of the motor shows the rotation from the reference position $O_v$ or $O_H$ of the seat 10. In addition, at this time, if the respective motors are rotated clockwise, the supports of the seat posture driving units are respectively raised. Thus, by rotating the motors, it is possible to control the posture in correspondence with the running of the vehicle.

As shown in FIG. 7, the controller 40 comprises a read-only memory (ROM) 44, a random-access memory (RAM) 46, a central processing unit (CPU) 42, input ports 50, output ports 52, and buses 48 such as data buses and control buses which connect them. It should be noted that fuzzy inference rules, which are used for effecting fuzzy inference which will be described later, control programs, and the like are stored in advance in the ROM 44.

Connected to the input ports 50 are a steering wheel sensor 62, a vehicle speed sensor 64, stroke sensors 66A, 66B, 66C, 66D, and encoders 68A, 68B, 68C, 68D.

The steering wheel sensor 62 outputs a signal corresponding to the rotation of the steering wheel 16, i.e., a steering angle. In addition, the vehicle speed sensor 64 is attached to a cable of a speedometer (not shown) for indicating the vehicle speed, and outputs a signal corresponding to a vehicle speed V. The stroke sensors 66A-66D are attached to the unillustrated suspension, and output signals corresponding to a displacement between the vehicle body and the respective wheels. The encoders 68A-68D are attached to the respective rotating shafts of the motors 34A-34D. As the rotational angles of the motors 34A-34D are respectively detected by the encoders, the vertical positions of the supports 22A-22D of the seat posture driving units 20A-20D can be detected.

The output ports 52 are connected to the rotatively driving units 35A, 35B, 35C and 35D via an amplifier 54.

In addition, a memory 56 is connected to the buses 48, and tables of a correction coefficient hj (j=A, B, C, or D and corresponds to A, B, C, or D in the reference numerals 35A-35D, 20A-20D appended to the rotatively driving units and the seat posture driving units) shown in Tables 2 and 3 below are stored in the memory 56. These tables are used to calculate a corrected variable Hj for correcting a controlled variable Yj for controlling the posture of the seat by means of an amount of displacement dDj determined from a detected value of each stroke sensor. In other words, the tables show relationships between the amount of displacement dDj determined from a detected value of the stroke sensor and the corrected variable for control of the seat. For instance, the amount of displacement dDj of the stroke sensor during roll control is $\alpha \leq dDj < \beta$, and when the vehicle speed V is a high speed (PVL), the correction coefficient hj becomes 1/10 (Table 2). From this amount of displacement dDj of the stroke sensor, the relationship for determining the controlled variable for the seat posture is shown in Formula (1) below.

$$Yj = Yfj + hj \cdot Yfj \quad (1)$$

where
Yj: controlled variable for the seat
Yfj: controlled variable for the seat determined on the basis of the steering wheel sensor 62 and the vehicle speed sensor 64 (the running condition of the vehicle)

It should be noted that an average value, a maximum value, a minimum value, or the like of the stroke sensors 66A-66D may be used as the amount of displacement of the stroke sensor.

TABLE 2

| V | dDj |  |  |
|---|---|---|---|
|  | $dDj < \alpha$ | $\alpha \leq dDj < \beta$ | $\beta \leq dDj$ |
| ZR | 0 | 0 | 0 |
| PM | 0 | $\frac{3}{10} \cdot Lj$ | $\frac{5}{10} \cdot Lj$ |
| PL | 0 | $\frac{2}{10} \cdot Lj$ | $\frac{4}{10} \cdot Lj$ |
| PVL | 0 | $\frac{1}{10} \cdot Lj$ | $\frac{3}{10} \cdot Lj$ |

It should be noted that ZR, PM, PL, and PVL denote the vehicle speed V, respectively representing a low speed, a medium speed, a medium-high speed, and a high speed; Lj is the controlled variable for each of the seat posture driving units 20A-20D during roll control; and $\alpha$ and $\beta$ are constants.

TABLE 3

| $\theta$ | dDj |  |  |
|---|---|---|---|
|  | $dDj < \alpha$ | $\alpha \leq dDj < \beta$ | $\beta \leq dDj$ |
| ZR | 0 | 0 | 0 |
| PM | 0 | $\frac{3}{10} \cdot Kj$ | $\frac{5}{10} \cdot Kj$ |
| PL | 0 | $\frac{1}{10} \cdot Kj$ | $\frac{3}{10} \cdot Kj$ |

It should be noted that ZR, PM, and PL denote the rotational angle (steering angle) $\theta$ of the steering wheel 16, respectively representing a small angle, a medium angle, and a large angle; Kj is the controlled variable for each of the seat posture driving units 20A-20D during squat or dive control; and $\alpha$ and $\beta$ are constants.

Next, a description will be given of the controlled variables for the seat which are used in this embodiment. The present inventors have experimentally confirmed that control equivalent to a case of continuous control can be effected by setting two or three predetermined values beforehand and by controlling the seat posture on the basis of these predetermined values instead of continuously controlling the seat posture. Controlled variables L1-L3 (see Table 4) for swinging the seat transversely with the hip point P as a center and controlled variables K1, K2 (see Table 5) for swinging the seat longitudinally with the hip point P as a center are set as the controlled variables for the seat used in this embodiment. These controlled variables become gradually larger in the order of L1, L2, and L3 and in the order of K1 and K2, starting from the reference position at the seat.

TABLE 4

|  | Left Side |  |  | Initial Position | Right Side |  |  |
|---|---|---|---|---|---|---|---|
|  | Large |  | Small | Neutral | Small |  | Large |
| Transverse Control | L3 | L2 | L1 | 0 | L1 | L2 | L3 |

TABLE 5

|  | Forward Side |  | Initial Position | Rear Side |  |
|---|---|---|---|---|---|
|  | Large | Small | Neutral | Small | Large |
| Longitudinal Control | K2 | K1 | 0 | K1 | K2 |

It should be noted that although the controlled variables above are listed only with respect to cases where control is effected in a positive direction (in a direction in which the support of the seat posture driving unit is raised), when control is effected in a negative direction, the codes are only reversed from positive to negative.

In this embodiment, fuzzy inference is employed to calculate the controlled variables for the seat posture. Table 6 below shows fuzzy inference rules for roll control during the rolling of the vehicle, which are used in this fuzzy inference. It should be noted that Table 6 shows the fuzzy inference rules during a turn to the right by turning the steering wheel clockwise, and the fuzzy inference rules, when put to practice, are expressed in the form of "if . . . then . . ."

TABLE 6

| $\theta$ | $d\theta$ | V |  |  |  |
|---|---|---|---|---|---|
|  |  | ZR | PM | PL | PVL |
| ZR |  | (a) ZR | (b) ZR | (c) ZR | (d) ZR |
| RM | ZR | (e) ZR | (f) ZR | (g) PS | (h) PM |
|  | PL | (i) ZR | (j) PS | (k) PM | (l) PL |
| RL | ZR | (m) ZR | (n) PS | (o) PM | (p) PM |
|  | PL | (q) ZR | (r) PS | (s) PL | (t) PL |

In Table 6, $\theta$ is a rotational angle of the steering wheel; $d\theta$ is an angular velocity of the steering wheel; V is a vehicle speed; and (a)-(t) denote the numbers of the fuzzy inference rules.

In addition, with respect to the rotational angle $\theta$ of the steering wheel, ZR denotes a linguistic value of being small; RM, that of being medium; and RL, that of being large. With respect to the vehicle speed V, ZR denotes a linguistic value of low speed; PM, that of medium-low speed; PL, medium-high speed; and PVL, that of high speed. With respect to the seat posture, ZR denotes a linguistic value of effecting no postural control; PS, that of inclining slightly; PM, that of inclining by a medium degree; and PL, that of inclining by a large degree.

Accordingly, the fuzzy inference rules (a) to (d), (g), (f), (k), and (t) in Table 6 can be expressed in the form of "if . . . then . . ." as follows:

(a)-(d) If the rotational angle of the steering wheel is small, then no seat posture control is effected.

(g) If the steering wheel is turned clockwise by a medium degree, and if the angular velocity of the steering wheel is small and the vehicle speed V is a medium-high speed, then the seat is inclined slightly to the right.

(f) If the steering wheel is turned clockwise by a medium degree, and if the angular velocity of the steering wheel is small and the vehicle speed V is a medium-low speed, then no seat posture control is effected.

(k) If the steering wheel is turned clockwise by a medium degree, and if the angular velocity of the steering wheel is small and the vehicle speed V is a medium-high speed, then the seat is inclined to the right by a medium degree.

(t) If the steering wheel is turned clockwise by a large degree, and if the angular velocity of the steering wheel is large and the vehicle speed V is a high speed, then the seat is inclined to the right by a large degree.

It should be noted that the rules other than the rules (a)–(d), (g), (f), (k) and (t) can be expressed in the form of "if . . . then . . ." in a manner similar to the one described above, so that a description thereof will be omitted.

Meanwhile, when turning to the left by turning the steering wheel 16 counterclockwise conversely to the above, the seat posture control is effected in manner symmetrical to the rightward inclination described above. Therefore, as for the fuzzy rules during a turn to the left, it suffices if the linguistic values ZR, RM and RL in Table 6, respectively representing that the clockwise rotational angle of the steering wheel 16 is small, medium, and large, are substituted by linguistic values ZR, LM and LL, respectively representing that the counterclockwise rotational angle of the steering wheel 16 is small, medium, and large, and if control is provided in such a manner as to incline the seat to the left. Accordingly, the fuzzy inference rules in the case of turning to the left can be readily inferred by reversing the direction in Table 6.

Figure 8A:
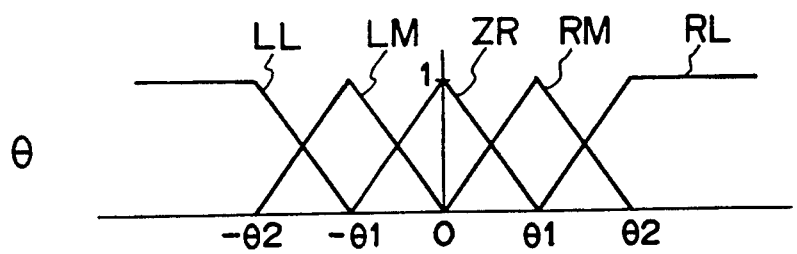
FIGS. 8A to 8F are diagrams illustrating membership functions.

The aforementioned linguistic values ZR, RM and RL, respectively representing that the clockwise rotational angle $\theta$ of the steering wheel 16 is small, medium, and large, are quantified by membership functions shown in FIG. 8A. ZR denotes a characteristic in which the degree of membership gradually decreases from 1 to 0 as the rotational angle $\theta$ increases from 0 to $\theta1$ with a central position (angle) at the steering wheel 16 set as a 0 degree (see FIG. 6). RM denotes a characteristic in which as the rotational angle increases from 0 to $\theta1$, the degree of membership gradually increases from 0 to 1, and as the rotational angle increases from $\theta1$ to $\theta2$, the degree of membership gradually decreases from 1 to 0. RL denotes a characteristic in which as the rotational angle increases from $\theta1$ to $\theta2$, the degree of membership increases from 0 to 1, and the degree of membership becomes 1 at $\theta2$ or more.

Meanwhile, the linguistic values ZR, LM and LL, respectively representing that the counterclockwise rotational angle $\theta$ of the steering wheel 16 is small, medium, and large, denote characteristics in which the codes of the aforementioned clockwise rotational angle are reversed from positive to negative.

Figure 8B:
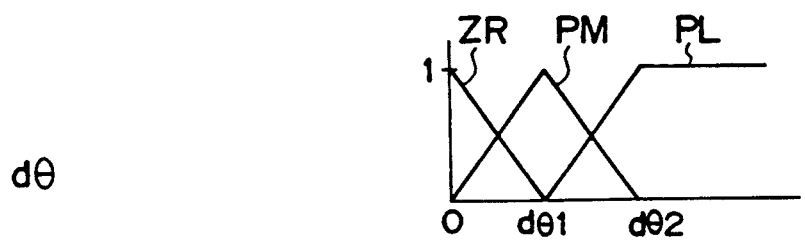

In addition, the linguistic values ZR and PL representing that the angular velocity $d\theta$ of the steering wheel is small and large are similarly quantified by the membership functions shown in FIG. 8B. ZR denotes a characteristic in which as the angular velocity $d\theta$ increases from 0 to $d\theta1$, the degree of membership gradually decreases from 1 to 0. PL denotes a characteristic in which as the angular velocity $d\theta$ increases from $d\theta1$ to $d\theta2$, the degree of membership gradually increases from 0 to 1, and the degree of membership becomes 1 when the angular velocity $d\theta$ is $d\theta2$ or more. Although not shown in Table 6, the linguistic value PM representing that the angular velocity $d\theta$ of the steering wheel is medium denotes a characteristic in which as the angular velocity $d\theta$ increases from 0 to $d\theta1$, the degree of membership gradually increases from 0 to 1, and as the angular velocity $d\theta$ increases from $d\theta1$ to $d\theta2$, the degree of membership gradually decreases from 1 to 0. It should be noted that this linguistic value PM is used in Table 16 which will be referred to later.

Figure 8C:
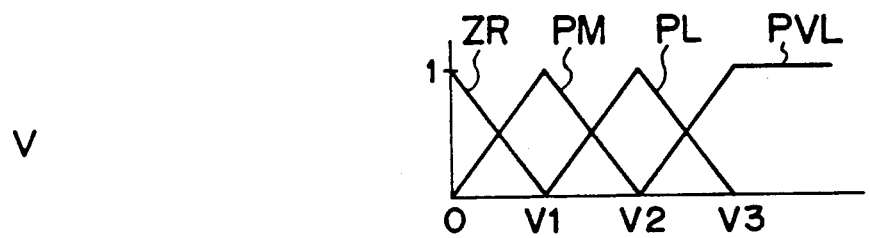

Similarly, the linguistic values ZR, PM, PL, and PVL, respectively representing that the vehicle speed V is a low speed, a medium-low speed, a medium-high speed, and a high speed, are quantified by the membership functions shown in FIG. 8C. ZR denotes a characteristic in which as the vehicle speed V increases from 0 to V1, the degree of membership gradually decreases from 1 to 0. PM denotes a characteristic in which as the vehicle speed V increases from 0 to V1, the degree of membership gradually increases from 0 to 1, and as the vehicle speed V increases from V1 to V2, the degree of membership gradually decreases from 1 to 0. PL denotes a characteristic in which as the vehicle speed V increases from V1 to V2, the degree of membership gradually increases from 0 to 1, and as the vehicle speed V increases from V2 to V3, the degree of membership gradually decreases from 1 to 0. PVL denotes a characteristic in which as the vehicle speed V increases from V2 to V3, the degree of membership gradually increases from 0 to 1, and when the vehicle speed V is V3 or more, the degree of membership becomes 1.

Figure 8D:
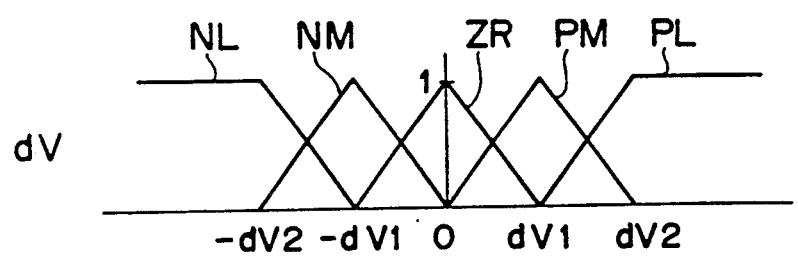
Figure 8E:
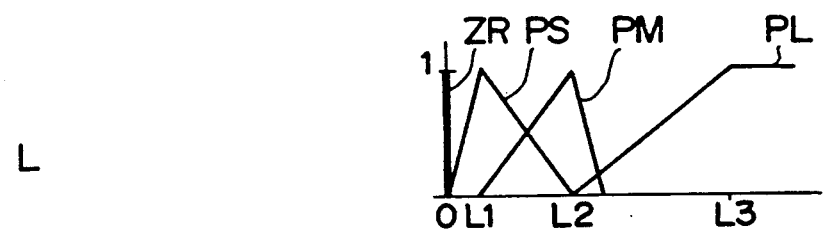

In addition, the linguistic values ZR, PS, PM, and PL concerning control for swinging the seat to the left or right with the hip point P as a center, respectively representing that no postural control of the seat is effected, and that the seat is inclined slightly to the right, is inclined by a medium degree, and is inclined by a large degree, are quantified by the membership functions shown in FIG. 8E. ZR denotes a characteristic in which when the controlled variable Yj of the posture is 0, the degree of membership becomes 1. PS denotes a characteristic in which as the controlled variable Yj of the posture increases from 0 to L1, the degree of membership increases from 0 to 1, and as the controlled variable Yj increases from L1 to L2, the degree of membership decreases from 1 to 0. PM denotes a characteristic in which as the controlled variable Yj of the posture increases from L1 to L2, the degree of membership increases from 0 to 1, and thereafter decreases to 0. PL denotes a characteristic in which as the controlled variable Yj of the posture increases from L2 to L3, the degree of membership increases from 0 to 1 and is thereafter held at 1.

When control is effected for inclining the seat, the seat is swung to the left or right with the hip point P as a center, so that the amount of displacement on the right-hand side of the seat and the amount of displacement on the left-hand side thereof become identical amounts symmetrical with respect to the reference position. For instance, in a case where the seat is inclined to the right by L1, it suffices if the controlled variables for the right-hand seat posture driving units 20A, 20B are set to $-L1$, and the controlled variables for the left-hand seat posture driving units 20C, 20D are set to L1. Meanwhile, in a case where the seat is inclined to the left by L1, it suffices if the controlled variables for the right-hand seat posture driving units 20A, 20B are set to L1, and the controlled variables for the left-hand seat posture driving units 20C, 20D are set to—L1.

Referring now to the flowchart shown in FIG. 15, a description will be given of an example in which controlled variables for the seat posture are determined by conducting fuzzy inference on the basis of the above-described fuzzy rules and membership functions.

Figure 15:
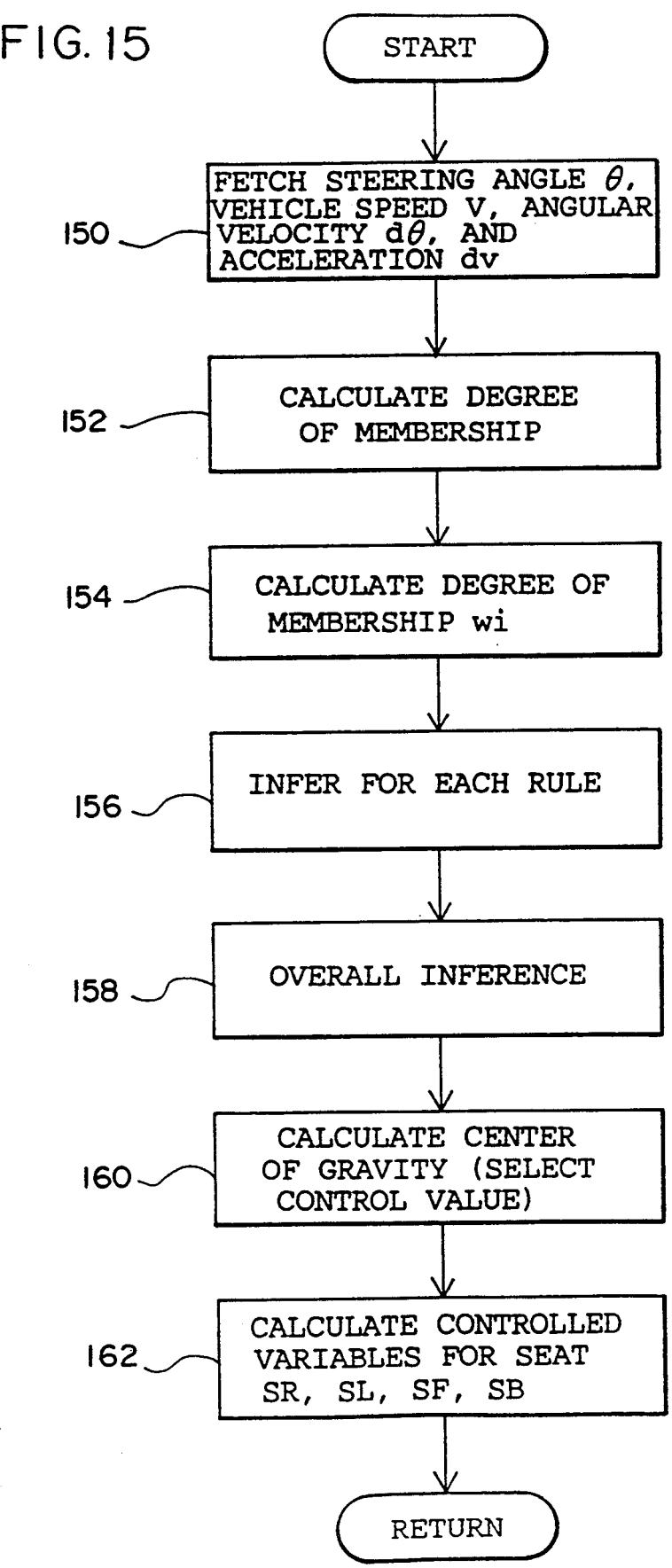
FIG. 15 is a flowchart illustrating a subroutine for arithmetic processing of a controlled variable for a seat in the control routine in accordance with the first embodiment.

As shown in FIG. 15, when processing for determining controlled variables for the seat posture is started, the operation proceeds to Step 150 to fetch the angle $\theta$ of the steering wheel 16, the vehicle speed V, the angular velocity $d\theta$ of the steering wheel 16, and the acceleration dV of the vehicle, all of which are detected and stored in the memory.

In Step 152, in accordance with the fuzzy inference rules described above, a calculation is made of the degree of membership (membership value) corresponding to the angle $\theta$ of the steering wheel 16, the vehicle speed V, the angular velocity $d\theta$ of the steering wheel 16, and the acceleration dV of the vehicle on the basis of the respective membership functions, i.e., of the degree of fulfillment of conditions which are antecedents of the resepective fuzzy rules. In Step 154, with respect to each of the above-described rules, a calculation is made of an AND of the degrees of membership, i.e., a minimum value wi (i is the number of each rule) of the degree of membership, namely, the goodness of fit concerning the angle $\theta$ of the steering wheel 16, the vehicle speed V, the angular velocity $d\theta$ of the steering wheel 16, and the acceleration dV of the vehicle.

In an ensuing Step 156, a result of inference is calculated for each of the rules described above. That is, a set of the membership functions, which includes such as ZR, PS, PM, and PL for quantifying the condition of the seat posture, and which is a set in which functions corresponding to the aforementioned rules are weighted by the goodness of fit wi, is determined. In other words, a set Wi consisting of an AND of the goodness of fit wi and the membership functions such as ZR, PS, PM, and PL, i.e., a minimum value, is determined.

In an ensuing Step 158, an overall result of inference is calculated from the results of inference calculated for the respective rules. That is, a set W, which is a result of inference as a sum of the respective sets Wi thus obtained, is determined. In Step 160, the center of gravity of the set W is determined, and the closest controlled variables for the seat are selected from among 0, L1, L2, L3, K1, K2 on the basis of the respective values of the center of gravity determined.

In Step 162, the respective controlled variables for the seat posture driving units 20A to 20D for the seat are calculated from the controlled variables selected. For instance, during the above-described roll control (when the seat is inclined to the left or right), controlled variables SR for the seat posture driving units 20A, 20B and controlled variables SL for the seat posture driving units 20C, 20D are calculated.

A description will be given of roll control during the turning of the vehicle by citing the two rules (f) and (g) in Table 6 above. In this example, the rotational angle $\theta$ of the steering wheel 16 is $\theta a$, the angular velocity $d\theta$ is $d\theta a$, and the vehicle speed V is Va. With respect to the rule (f), the membership functions (see FIGS. 8A to 8F) shown in FIG. 9A are employed. As shown in FIG. 9B, as for the rotational angle $\theta$ of the steering wheel 16, the degree of membership is calculated by means of RM, and as for the angular velocity $d\theta$, the degree of membership is calculated by means of ZR. Similarly, as for the vehicle speed V, the degree of membership is calculated by means of PM. As a result, as shown in FIG. 9B, a minimum value of the degree of membership thus determined is calculated as the goodness of fit w1. The same holds true of the rule (g) as well, and as shown in FIG. 9C, the degree of membership is calculated, and a minimum value of the degree of membership is calculated as the goodness of fit w2.

Accordingly, the set W (see FIG. 9D) indicated by a shadowed portion and obtained by combining, on the one hand, a set W1 (see FIG. 9B) concerning the rule (f) in which ZR representing the membership function of the controlled variable for the seat is cut off by the goodness of fit w1 and, on the other hand, a set W2 (see FIG. 9C) indicated by a shadowed portion concerning the rule (g) in which PS representing the membership function of the controlled variable for the seat is cut off by the goodness of fit w2, is determined as the result of fuzzy inference. The center of gravity of this set W is determined, and L1 which is the controlled variable (one of 0, L1, L2, and L3) closest to the center of gravity is determined as the controlled variable for the seat. From the controlled variable thus determined, the driving values of the seat posture driving units 20A–20D are calculated. That is, the controlled variables SR for the seat posture driving unit 20A, 20B are set to —L1, and the controlled variables SL for the seat posture driving unit 20C, 20D are set to L1.

In addition, when inference is conducted by using the rules (j) and (k) in Table 6 above, the membership functions (see FIGS. 8A to 8F) shown in FIG. 10A are employed with respect to the rule (j). At this time, if the rotational angle $\theta$ of the steering wheel 16 is $\theta b$, the angular velocity $d\theta$ is $d\theta b$, and the vehicle speed V is Vb. As shown in FIG. 10B, as for the rotational angle $\theta$ of the steering wheel 16, the degree of membership is calculated by means of RM, and as for the angular velocity $d\theta$, the degree of membership is calculated by means of PL. Then, as shown in FIG. 10B, a minimum value of the degree of membership thus determined is set as the goodness of fit w1. The same holds true of the rule (k) as well, and as shown in FIG. 10C, the degree of membership is calculated, and a minimum value of the degree of membership calculated is set as the goodness of fit w2.

Accordingly, the set W (see FIG. 10D) indicated by a shadowed portion and obtained by combining, on the one hand, the set W1 (see FIG. 10B) concerning the rule (j) in which PS representing the membership function of the controlled variable for the seat is cut off by the goodness of fit w1 and, on the other hand, the set W2 (see FIG. 10C) indicated by a shadowed portion concerning the rule (k) in which PM representing the membership function of the controlled variable for the seat is cut off by the goodness of fit w2, is determined as the result of fuzzy inference. The center of gravity of this set W is determined, and L2 which is the controlled variable (one of 0, L1, L2, and L3) closest to the value of the center of gravity is determined as the controlled variable for the seat. From the controlled variable thus determined, the driving values of the seat posture driving units 20A–20D are calculated. That is, the controlled variables SR for the seat posture driving unit 20A, 20B are set to —L2, and the controlled variables SL for the seat posture driving unit 20C, 20D are set to L2.

Next, Table 7 below shows an example of fuzzy inference rules for squat and dive control when the vehicle is accelerated or decelerated.

TABLE 7

| V | dV NL | NM | ZR | PM | PL |
|---|---|---|---|---|---|
| ZR | | | (a) AF,AB = ZR | | |
| PM | (b) AF = PM AB = NL | (c) AF = ZR AB = PM | (d) AF,AB = ZR | (e) AF = ZR AB = PM | (f) AF = ZR AB = PL |
| PL | (g) AF = PM AB = NL | (h) AF = ZR AB = NM | (i) AF,AB = ZR | (j) AF = ZR AB = PM | (k) AF = ZR AB = PL |
| PVL | (l) AF = PL AB = NL | | (m) AF,AB = ZR | | (n) AF = NM AB = PL |

In Table 7, V is the vehicle speed; dV is the acceleration of the vehicle; AF is the controlled variable for the front side of the seat; AB is the controlled variable for the rear side of the seat; and (a)-(n) denote the numbers of the fuzzy inference rules.

As mentioned earlier, ZR, PM, PL, and PVL concerning the vehicle speed V represent linguistic values of being a low speed, a medium-low speed, a medium-high speed, and a high speed, respectively. In addition, with regard to the acceleration dV, ZR, PM, and PL represent linguistic values of the acceleration being small, increasing slightly, and increasing by a large degree, respectively, while NM and NL represent linguistic values of decreasing slightly and decreasing by a large degree, respectively.

Furthermore, with respect to the control of the seat, ZR represents a linguistic value of effecting no control; PM and PL represent linguistic values of raising the seat slightly and raising the seat by a large degree, respectively; and NM and NL represent linguistic values of lowering the seat slightly and lowering the seat by a large degree, respectively.

Accordingly, the fuzzy inference rules in Table 7 can be expressed in the form of "if . . . then . . ." as follows:

(a), (d), (j), and (m) If the acceleration dV of the vehicle is small, no seat posture control is effected.

(e) If the acceleration dV of the vehicle has increased slightly and the vehicle speed V is the medium-low speed, then no front-side postural control is effected for the seat, and the rear side of the seat is raised slightly.

(n) If the acceleration dV of the vehicle has increased by a large degree and the vehicle speed V is the high speed, then the front side of the seat is lowered slightly, and the rear side of the seat is raised by a large degree.

(h) If the acceleration dV of the vehicle has decreased slightly and the vehicle speed V is the medium-high speed, then no front-side postural control is effected for the seat, and the rear side of the seat is lowered slightly.

(l) If the acceleration dV of the vehicle has decreased by a large degree and the vehicle speed V is the high speed, then the front side of the seat is raised by a large degree, and the rear side of the seat is lowered by a large degree.

It should be noted that the rules other than the rules described above can be expressed in the form of "if . . . then . . ." in a manner similar to the one described above, so that a description thereof will be omitted.

The linguistic values ZR, PM, PL, NM, and NL, respectively representing that the aforementioned acceleration dV is small, has increased slightly, has increased by a large degree, has decreased slightly, and has decreased by a large degree, are quantified by membership functions shown in FIG. 8D. ZR denotes a characteristic in which the degree of membership decreases from 1 to 0 as the acceleration dV increases from 0 to dV1, and the degree of membership decreases from 1 to 0 as the acceleration dV decreases from 0 to −dV1. PM denotes a characteristic in which the degree of membership increases from 0 to 1 as the acceleration dV increases from 0 to dV1, and the degree of membership decreases from 1 to 0 as the acceleration dV increases from dV1 to dV2. PL denotes a characteristic in which the degree of membership increases from 0 to 1 as the acceleration dV increases from dV1 to dV2, and the degree of membership becomes 1 when the acceleration dV is dV2 or more. NM denotes a characteristic in which the degree of membership increases from 0 to 1 as the acceleration dV decreases from 0 to −dV1, and the degree of membership decreases from 1 to 0 as the acceleration dV decreases from −dV1 to −dV2. NL denotes a characteristic in which the degree of membership increases from 0 to 1 as the acceleration dV decreases from −dV1 to −dV2, and the degree of membership becomes 1 when the acceleration dV is −dV2 or less.

Figure 8F:
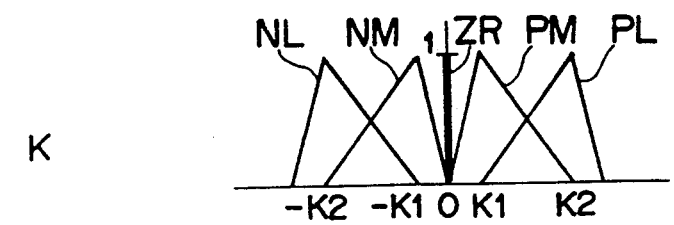

In addition, the linguistic values ZR, PM, PL, NM, and NL concerning control for swinging the seat forward and backward with the hip point P as a center are quantified by the membership functions shown in FIG. 8F. ZR denotes a characteristic in which when the controlled variable Yj of the posture is 0, the degree of membership becomes 1. PM denotes a characteristic in which as the controlled variable Yj of the posture increases from 0 to K1, the degree of membership increases from 0 to 1, and as the controlled variable Yj of the posture increases from K1 to K2, the degree of membership decreases from 1 to 0. PL denotes a characteristic in which as the controlled variable Yj of the posture increases from K1 to K2, the degree of membership increases from 0 to 1 and thereafter decreases to 0. NM denotes a characteristic in which as the controlled variable Yj of the posture decreases from 0 to −K1, the degree of membership increases from 0 to 1, and as the controlled variable Yj of the posture decreases from −K1 to −K2, the degree of membership decreases from 1 to 0. NL denotes a characteristic in which as the controlled variable Yj of the posture decreases from −K1 to −K2, the degree of membership decreases from 1 to 0, and when the controlled variable Yj of the posture is −K2 or less, the degree of membership decreases gradually from 1 to 0.

Next, a description will be given of an example in which controlled variables for the seat posture are determined by conducting fuzzy inference on the basis of the above-described fuzzy rules and membership functions with respect to squat control when the vehicle accelerates and dive control when the vehicle decelerates.

In squat control or dive control, by referring to the flowchart shown in FIG. 15 referred to for the above-described roll control, controlled variables SB and SF are determined in Step 162. With respect to squat control when the vehicle accelerates, a description will be given by citing an example in which inference is conducted by using the two rules (j) and (k) in Table 7 above. In this case, it is assumed that the vehicle speed V is Vc and the acceleration dV is dVc.

Figure 11A:
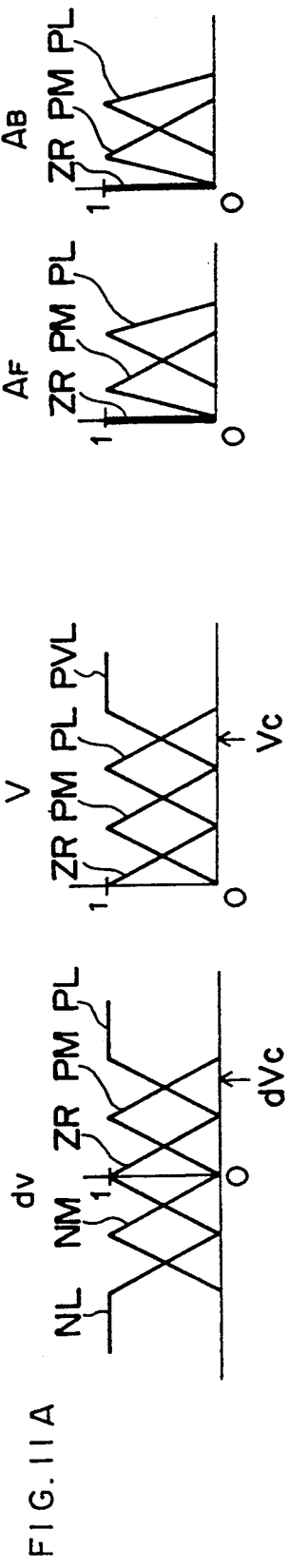
FIG. 11A is a diagram illustrating the membership functions.
Figure 11B:
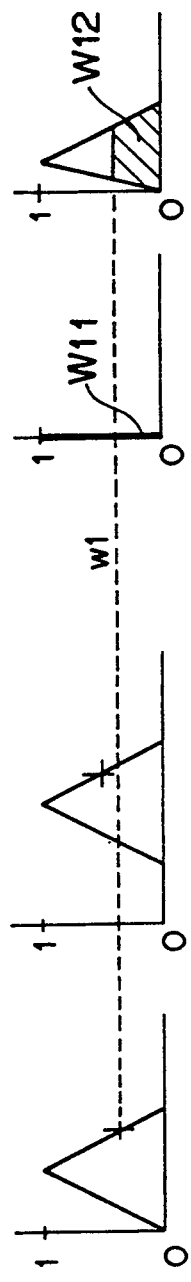
FIGS. 11B and 11C are image diagrams illustrating the fuzzy inference process.
Figure 11C:
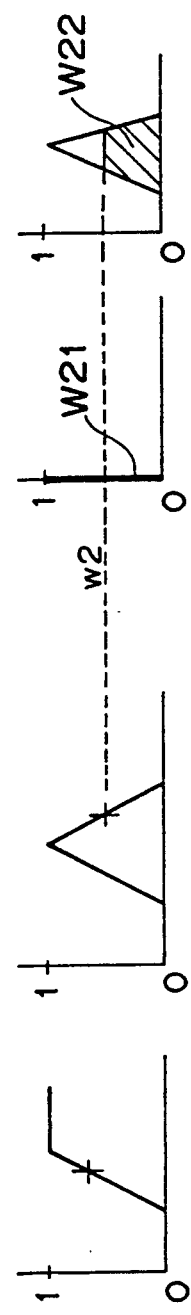

With regard to the rule (j), the membership functions (see FIGS. 8A to 8F) shown in FIG. 11A are employed. As for the vehicle speed V, the degree of membership is calculated by means of PL, and as for the acceleration dV, the degree of membership is calculated by means of PM, as shown in FIG. 11B. As a result, as shown in FIG. 11B, with respect to the rule (j), a minimum value of the degree of membership determined is calculated as the goodness of fit w1. The same holds true of the rule (k) as well, and a minimum value of the degree of membership is calculated as the goodness of fit w2, as shown in FIG. 11C.

Figure 11D:
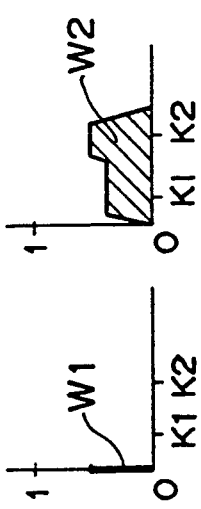
FIG. 11D is an image diagram illustrating a result of fuzzy inference.

Accordingly, with regard to the rule (j), a set W11 and a set W12, indicated by a shadowed portion, in which ZR representing the membership function of the controlled variable AF for the front side of the seat and PM representing the membership function of the controlled variable AB for the rear side of the seat are respectively cut off by the goodness of fit w1 (see FIG. 11B). In addition, with respect to the rule (k), a set W21 and a set W22, indicated by a shadowed portion, in which ZR representing the membership function of the controlled variable AF for the front side of the seat and PL representing the membership function of the controlled variable AB for the rear side of the seat are respectively cut off by the goodness of fit w2, are obtained (see FIG. 11C). Then, the set W1, obtained by combining the sets W11 and W21, as well as the set W2, indicated by a shadowed portion and obtained by combining the sets W12 and W22, become the results of fuzzy inference (see FIG. 11D). The centers of gravity of these sets W1 and W2 are determined, and the controlled variable (one of 0, K1, and K2) 0 closest to the center of gravity of the controlled variable AF for the front side of the seat is determined to be the controlled variable SF for the front side of the seat, while the controlled variable K2 closest to the center of gravity of the controlled variable AB for the rear side of the seat is determined to be the controlled variable SB for the rear side of the seat. From the controlled variables thus determined, the driving values for the seat posture driving units 20A to 20D are calculated. That is, the controlled variable SF for the seat posture driving units 20A and 20C is set to be 0, while the controlled variable SB for the seat posture driving units 20B and 20D is set to be K2.

Next, a description will be given of dive control when the vehicle decelerates, by citing an example in which inference is conducted by using the two rules (h) and (g) in Table 7 above. In this case, it should be noted that the vehicle speed V is Vd and the acceleration dV is −dVd.

Figure 12A:
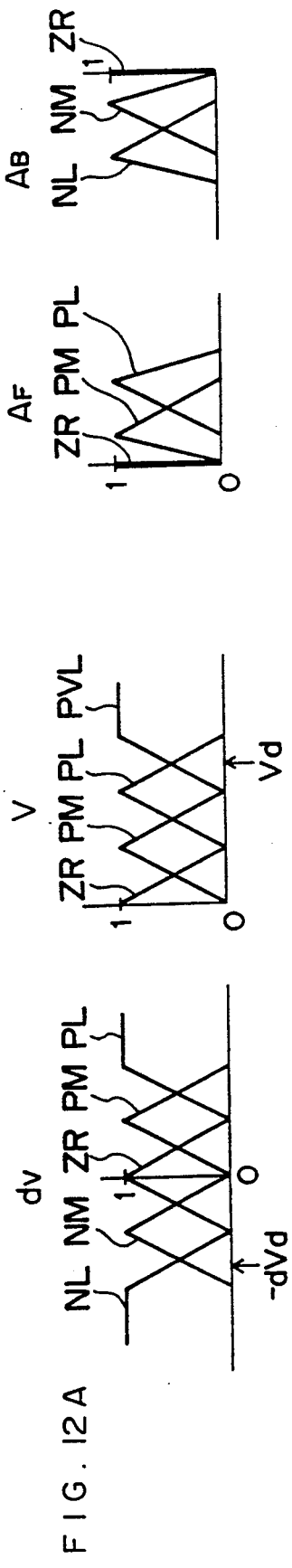
FIG. 12A is a diagram illustrating the membership functions.
Figure 12B:
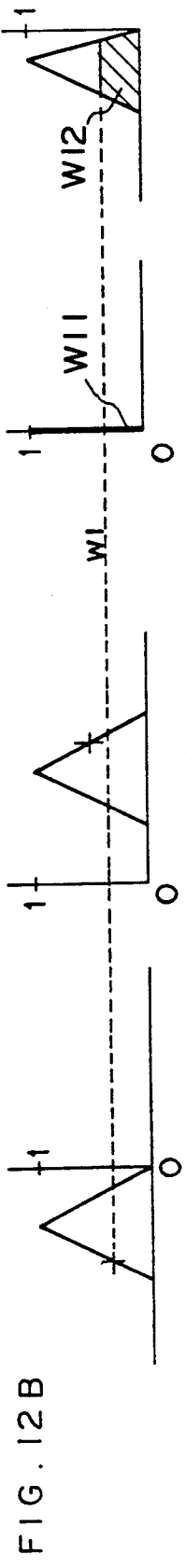
FIGS. 12B and 12C are image diagrams illustrating the fuzzy inference process.
Figure 12C:
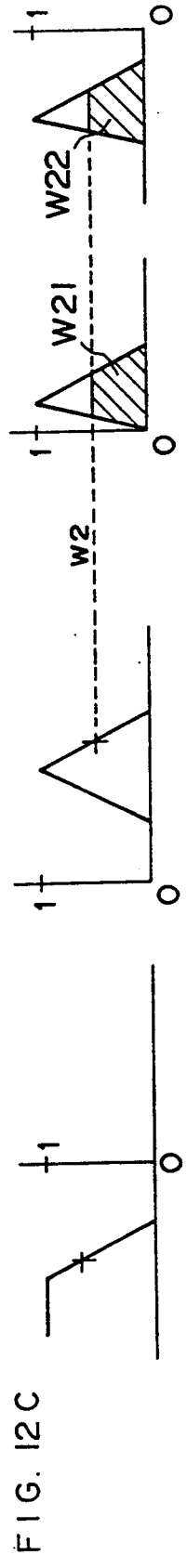

With regard to the rule (h), the membership functions (see FIGS. 8A to 8F) shown in FIG. 12A are employed. As for the vehicle speed V, the degree of membership is calculated by means of PL, and as for the acceleration dV, the degree of membership is calculated by means of NM, as shown in FIG. 12B. As a result, as shown in FIG. 12B, with respect to the rule (h), a minimum value of the degree of membership determined is calculated as the goodness of fit w1. As for the rule (g), a minimum value of the degree of membership is calculated as the goodness of fit w2, as shown in FIG. 12C.

Figure 12D:
FIG. 12D is an image diagram illustrating a result of fuzzy inference.

Accordingly, with regard to the rule (h), the set W11 and the set W12, indicated by a shadowed portion, in which ZR representing the membership function of the controlled variable AF for the front side of the seat and NM representing the membership function of the controlled variable AB for the rear side of the seat are respectively cut off by the goodness of fit w1 (see FIG. 12B). In addition, with respect to the rule (g), the set W21 and the set W22, indicated by a shadowed portion, in which PM representing the membership function of the controlled variable AF for the front side of the seat and NL representing the membership function of the controlled variable AB for the rear side of the seat are respectively cut off by the goodness of fit w2, are obtained (see FIG. 12C). Then, the set W1, obtained by combining the sets W11 and W21, as well as the set W2, indicated by a shadowed portion and obtained by combining the sets W12 and W22, become the results of fuzzy inference (see FIG. 12D). The centers of gravity of these sets W1 and W2 are determined, and the controlled variable (one of 0, K1, and K2) K1 closest to the center of gravity of the controlled variable AF for the front side of the seat is determined to be the controlled variable for the front side of the seat, while the controlled variable −K2 closest to the center of gravity of the controlled variable AB for the rear side of the seat is determined to be the controlled variable for the rear side of the seat. From the controlled variables thus determined, the driving values for the seat posture driving units 20A to 20D are calculated. That is, the controlled variable SF for the seat posture driving units 20A and 20C is set to be K1, while the controlled variable SB for the seat posture driving units 20B and 20D is set to be −K2.

Referring now to FIGS. 13, 14, 15 and 16, a description will be given of a control routine for controlling the seat posture in accordance with this embodiment.

Figure 13:
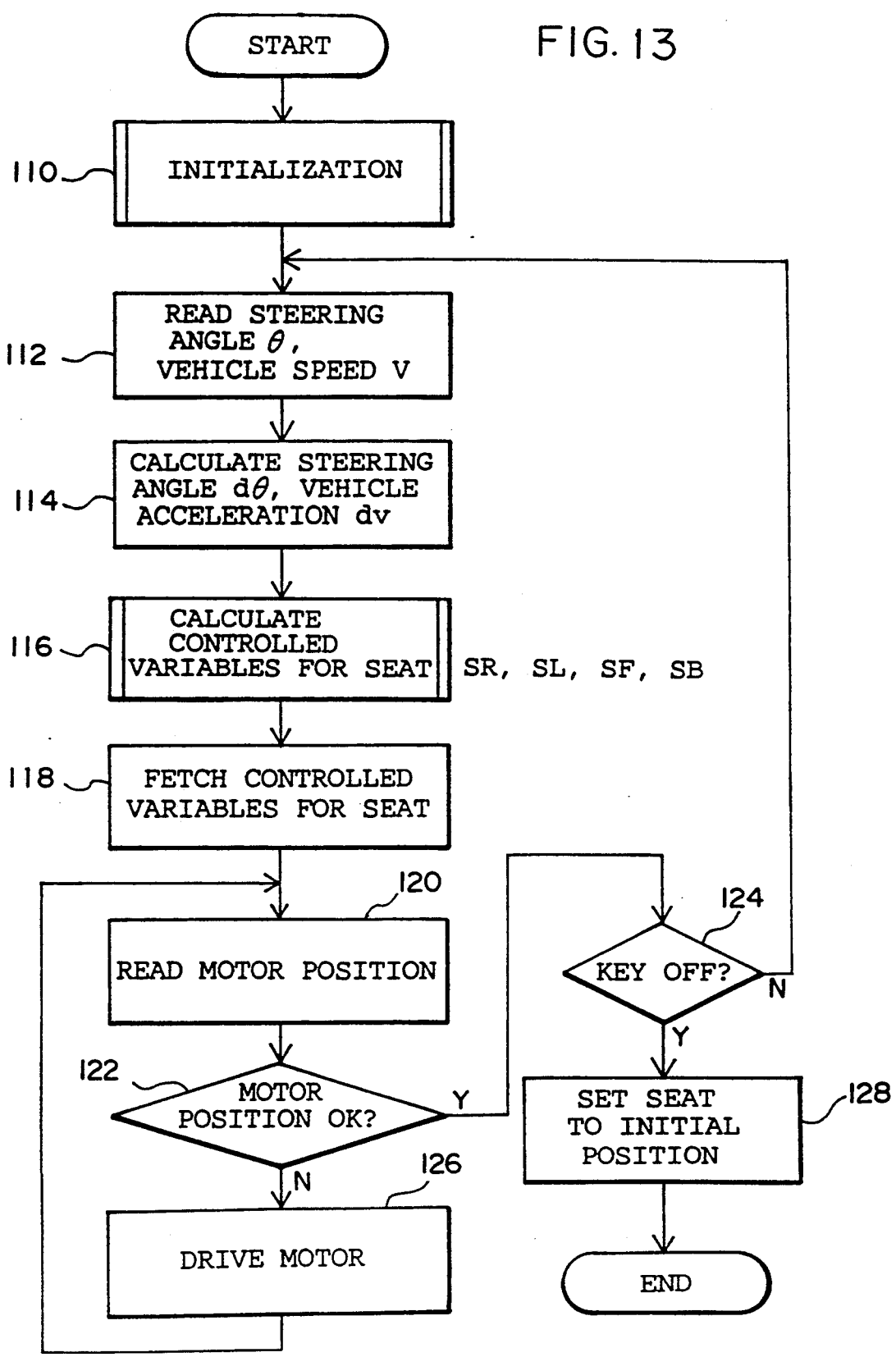
FIG. 13 is a flow chart illustrating a control routine in accordance with the first embodiment.

First, when the occupant starts the engine by turning on an ignition key of the vehicle, the control routine shown in FIG. 13 is started. Upon starting of this control routine, the operation proceeds to Step 110 to execute an initialization subroutine for this control program.

Figure 14:
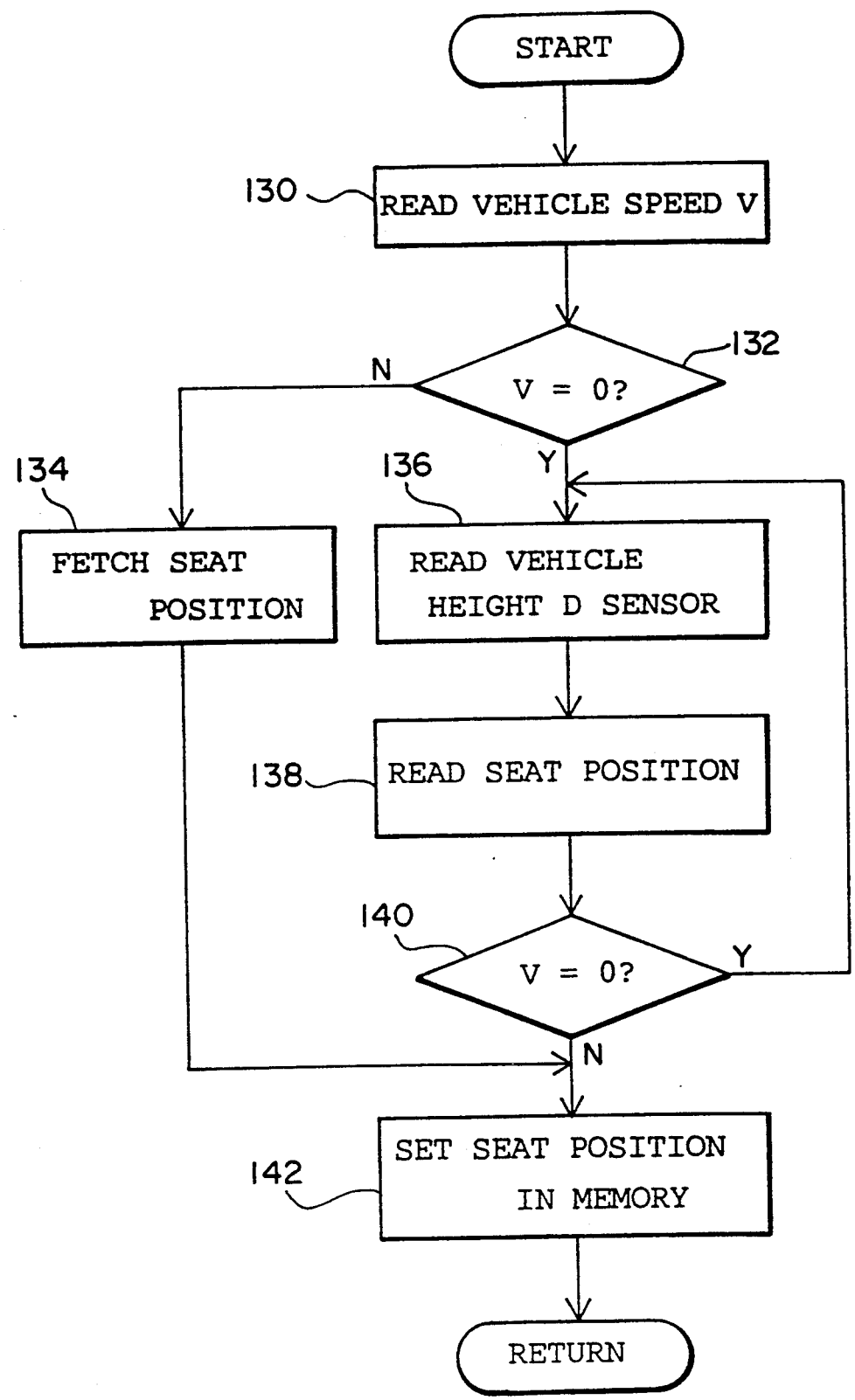
FIG. 14 is a flowchart illustrating initialization processing in the control routine in accordance with the first embodiment.

FIG. 14 shows the initialization subroutine, and the vehicle speed V is read in Step 130. In an ensuing Step 132, a determination is made as to whether or not the vehicle speed V=0 so as to determine whether or not the vehicle is at a standstill. If the vehicle is not at a standstill, the initial position of the seat which has already been stored is read in Step 134, and this initial position is stored in an unillustrated register. In Step 142, the position of the seat thus read is set in the memory, thereby completing this subroutine.

When the vehicle is at a standstill, the operation proceeds to Step 136 to read strokes detected by the stroke sensors 66A to 66D, and the operation proceeds to Step 138. In Step 138, outputs of the encoders 68A to 68D of the motors 34A to 34D are read. From the rotational positions (angles) of the motors 34A to 34D, the positions of the seat posture driving units 20A to 20D are obtained.

In Step 140, a determination is made as to whether or not V=0, and the reading of the outputs from the stroke sensors 66A to 66D and the encoders 68A to 68d is repeated while the vehicle is at a standstill. When the vehicle begins to travel, the operation proceeds to Step 142, the position of the seat thus read is stored in the unillustrated register, thereby completing this subroutine.

Thus, the detected values of the stroke sensors 66A to 66D and the encoders 68A to 68D when the vehicle is at a standstill are set as the initial values. It should be noted that when the vehicle is at a standstill such as to be inclined on a slope or the like, correction may be conducted in correspondence with the values of the stroke sensors 68A to 68D, and initial values equivalent to those in a case where the vehicle is at a standstill on the flat ground may be calculated and set.

Upon completion of the initialization subroutine in FIG. 13, the angle θ of the steering wheel 16 and the vehicle speed V are read in Step 112. Then, in Step 114, the angular velocity dθ of the steering wheel 16 and the acceleration dV of the vehicle are calculated on the basis of the angle θ of the steering wheel 16 and the vehicle speed V thus read. Upon completion of the calculation, the operation proceeds to Step 116 to calculate the controlled variables for the seat by utilizing fuzzy inference, as described above (see FIG. 15).

Upon completion of the calculation of the controlled variables for the seat posture, the operation proceeds to Step 118 to store the calculated controlled variables for the seat posture in the unillustrated register and to fetch the controlled variables for the seat posture stored. It should be noted that, in Step 118, an interruption subroutine which will be described later can be executed.

In Step 120, the positions of the motors 34A to 34D are read, and the operation proceeds to Step 122. In Step 122, a determination is made as to whether or not the motors 34A to 34D have rotated by the stored controlled variables for the seat posture, and if they have not rotated by the controlled variables for the posture, the operation proceeds to Step 126 to drive the respective motors 34A to 34D. This operation is repeated until the motors 34A to 34D are rotated by the controlled variables for the seat posture stored. Upon completion of control of the rotation of the motors 34A to 34D, the operation proceeds to Step 124 to determine whether or not the occupant has turned off the ignition key of the vehicle. If it is still on, the operation returns to Step 112, and if it is off, the operation proceeds to Step 128 to return the seat to its initial position, thereby completing this routine.

Here, in this embodiment, the arrangement provided is such that after calculation of the controlled variables for the seat by utilizing the fuzzy inference described above, the interruption subroutine is executed at each predetermined time. A description will be given hereafter of this interruption subroutine.

Figure 16:
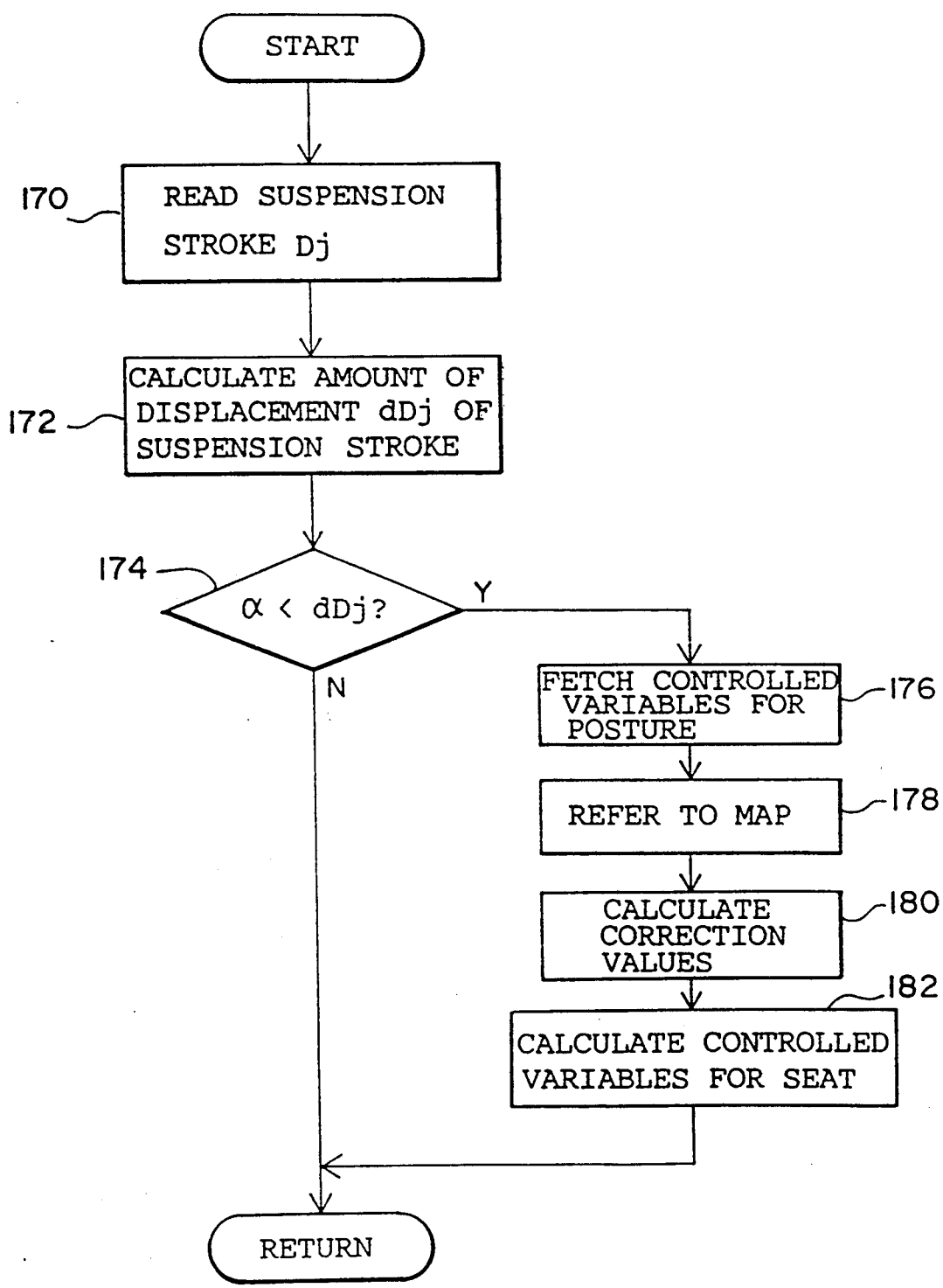
FIG. 16 is a flowchart illustrating a subroutine for interrupt processing in accordance with the first embodiment.

As shown in FIG. 16, when the interruption subroutine is started, in Step 170, strokes Dj (j=A, B, C, or D and corresponds to A, B, C, or D affixed to the reference numerals of the stroke sensors 66A to 66D) of the stroke sensors 66A to 66D are read, and the operation proceeds to Step 172. In Step 172, the amount of displacement dDj is calculated for each suspension unit, and the operation proceeds to Step 174. In Step 174, a determination is made as to whether or not the amounts of displacement of all the stroke sensors 66A to 66D are such that $\alpha$ (predetermined value) $<dDj$. If the amounts of displacement of all the stroke sensors 66A to 66D are such that $\alpha \geq dDj$, since the amounts of displacement are small, a determination is made that the posture of the vehicle has not undergone a displacement. Hence, this interruption subroutine is ended without correcting the controlled variables for the seat calculated above. However, if the amount of displacement of any one of the stroke sensors 66A to 66D is such that $\alpha <dDj$, since the amount of displacement is large, a determination is made that the posture of the vehicle has undergone a displacement, and the operation proceeds to Step 176. In Step 176, the controlled variables Yfj for the posture determined in Step 116 are fetched. At that time, the vehicle speed V and the rotational angle θ of the steering wheel 16 are also fetched. In addition, the vehicle speed V and the rotational angle q of the steering wheel 16 are made to correspond to ZR, PM, PL, and PVL each time they become greater by predetermined amounts. Upon completion of the fetching, the operation proceeds to Step 178, in which Table 2 is referred to in the case of roll control, and Table 3 is referred to in the case of squat or dive control. In Step 180, corrected variables (hj·Yfj) are calculated, and the operation proceeds to Step 182. In Step 182, after the controlled variables for the seat posture are calculated in accordance with Formula (1) above, the contents of the controlled variables Yfj for the posture determined in Step 116 are rewritten by these corrected controlled variables, thereby completing this interruption subroutine.

As a result, in the control of the seat posture, the controlled variables are altered to those to be applied after the displacement of the vehicle, and the seat is moved to this altered position. Thus, first of all, since the values for controlling the seat posture are calculated directly from the amounts of the running condition of the vehicle based on the rotational angle of the steering wheel, the angular velocity of the steering wheel, the vehicle speed, and the acceleration of the vehicle, it is possible to calculate the controlled variables for displacing the seat posture at an early stage. At the same time, even if the posture of the vehicle undergoes a change, the controlled variables once calculated are corrected in a direction in which the change in the vehicle's posture is offset in correspondence with the change in the vehicle's posture. Hence, the position of the seat can be controlled to a position in which the occupant feels comfortable.

In addition, since fuzzy control is employed in the above-described seat posture control, it is possible to provide control which is fitted to the driver's feeling. Furthermore, since control is effected transversely symmetrically about the hip point P located at the seat during roll control, the amount of vertical vibration of the driver's eyes is reduced, so that driving becomes stabilized.

The arrangement provided in the foregoing embodiment is such that the vehicle speed V and the rotational angle θ of the steering wheel 16 are fetched, the vehicle speed V and the rotational angle θ of the steering wheel 16 are made to correspond to ZR, PM, PL, and PVL, and Table 2 or 3 is referred to on the basis of ZR, PM, PL, and PVL; however, in this control, the corrected variables may be determined by making use of fuzzy inference.

Although, in the foregoing embodiment, a description has been given of an example in which the controlled variables for the seat posture are calculated from the amounts of the running condition of the vehicle determined on the basis of the steering wheel sensor 62 and the vehicle speed sensor 64, a vehicle-behavior sensor such as a G (acceleration) sensor may be used. Longitudinal and transverse G sensors may be used as such G sensors.

Table 8 below shows an example of fuzzy inference in a case where roll control is effected during a turn to the right by using these G sensors.

TABLE 8

| G | V | | | |
|---|---|---|---|---|
|  | ZR | PM | PL | PVL |
| ZR | ZR | ZR | ZR | ZR |
|  | BR = 0 | BR = 0 | BR = 0 | BR = 0 |
|  | BL = 0 | BL = 0 | BL = 0 | BL = 0 |
| RM | ZR | ZR | PS | PM |
|  | BR = 0 | BR = 0 | BR = L1 | BR = L2 |
|  | BL = 0 | BL = 0 | BL = −L1 | BL = −L2 |
| RL | ZR | PS | PM | PM |
|  | BR = 0 | BR = L1 | BR = L2 | BR = L2 |
|  | BL = 0 | BL = −L1 | BL = −L2 | BL = −L2 | where
- G: condition of the behavior of the vehicle (G sensors)
- V: vehicle speed
- BR: controlled variable for the right-hand side of the seat
- BL: controlled variable for the left-hand side of the seat Accordingly, the controlled variables for the seat posture are calculated on the basis of the values detected by the G sensors, and after the vehicle has undergone a displacement, the controlled variables are altered in correspondence with the displacement of the vehicle's posture, as described in the foregoing embodiment, and the seat is moved to the altered position. Thus, by using the G sensors, it is possible to directly detect the running condition of the vehicle without needing to determine the running condition of the vehicle through calculations. For this reason, first of all, from the amounts of the running condition of the vehicle based on the G sensors, it is possible to calculate the controlled variables for displacing the seat posture at an early stage. At the same time, even if the posture of the vehicle undergoes a change, the controlled variables once calculated are corrected in a direction in which the change in the vehicle's posture is offset in correspondence with the change in the vehicle's posture. Hence, the position of the seat can be controlled to a position in which the occupant feels comfortable.

It should be noted that, in the above-described embodiment, a description has been given of a case where the driver's seat is controlled. However, a passenger's seat may be controlled, and both the driver's and passenger's seats may be controlled.

Figure 17:
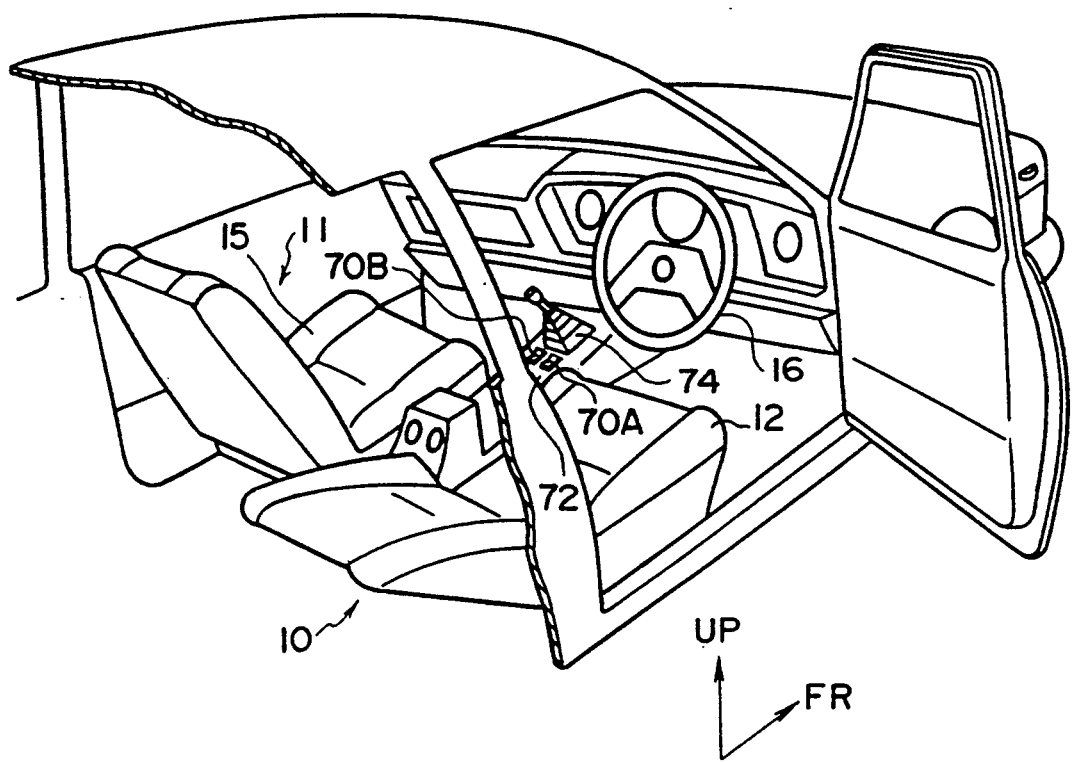
FIG. 17 is a perspective view illustrating a vehicle which can be used in a second embodiment of the present invention.
Figure 18:
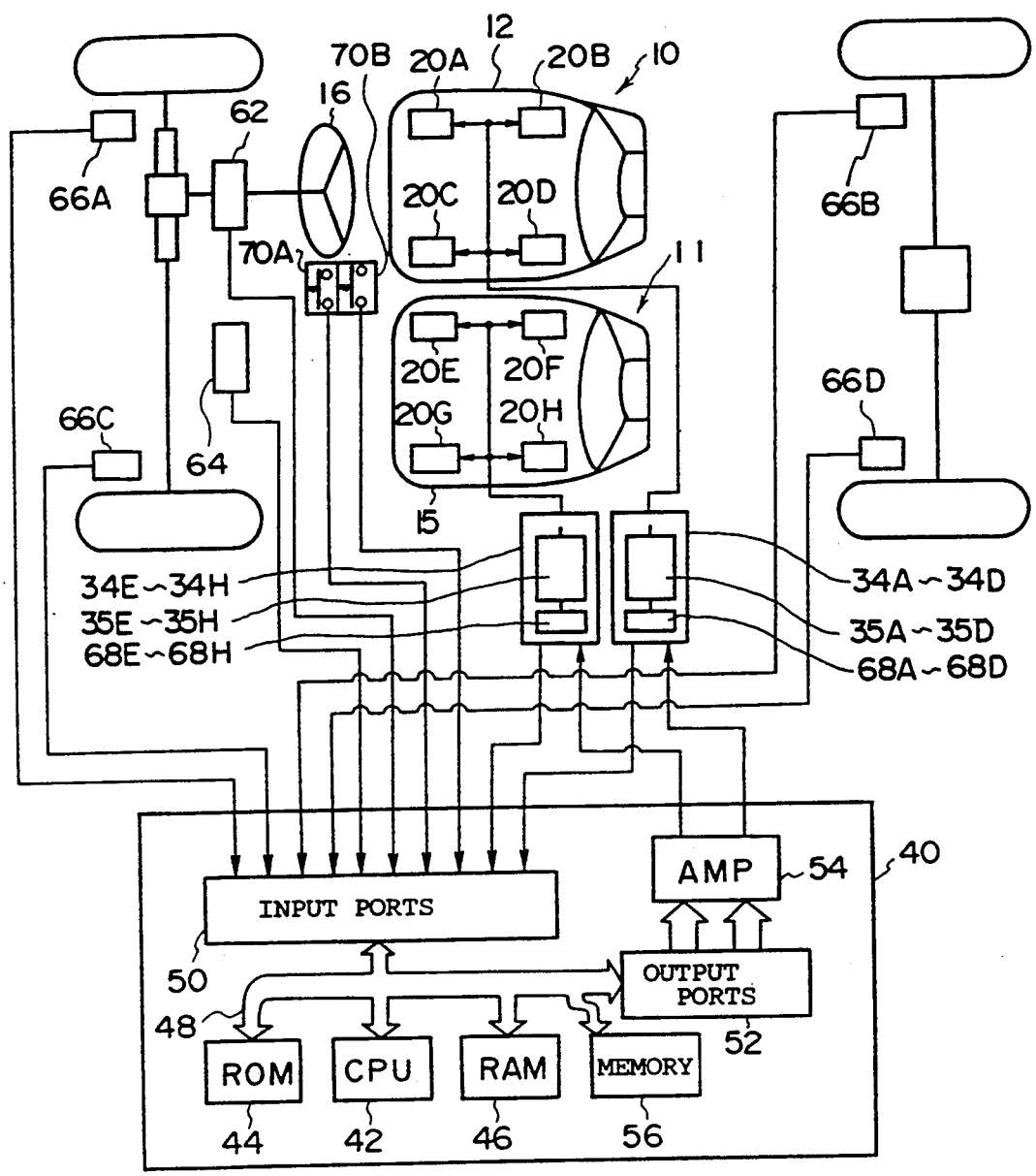
FIG. 18 is a block diagram of a configuration of a controller used in the second embodiment.

Next, a description will be given of a second embodiment of the present invention. As shown in FIGS. 17 and 18, in this embodiment, in the same way as the seat 10 described in the first embodiment, a seat posture driving unit 20E is disposed under a seat cushion 15 of a passenger's seat 11 on the forward right-hand side thereof, while a seat posture driving unit 20F is disposed under the seat cushion 15 on the rearward right-hand side thereof. Meanwhile, a seat posture driving unit 20G is disposed under the seat cushion 15 on the forward left-hand side thereof at a position symmetrical with respect to the seat posture driving unit 20E about a center line. Also, a seat posture driving unit 20H is disposed under the seat cushion 15 on the rearward left-hand side thereof at a position symmetrical with respect to the seat posture driving unit 20F about the center line. Since these seat posture driving units 20E, 20F, 20G, and 20H are structured in the same way as the seat posture driving unit 20A described with reference to FIGS. 3A and 3B, a description thereof will be omitted.

In addition, as described in the seat 10 of the first embodiment, if supports 22E, 22F of the seat posture driving units 20E, 20F are raised and supports 22G, 22H of the seat posture driving units 20G, 20H are lowered, the seat 11 rotates to the right-hand side with the hip point P as a center. Meanwhile, if, conversely, the supports 22E, 22F of the seat posture driving units 20E, 20F are lowered and the supports 22G, 22H of the seat posture driving units 20G, 20H are raised, the seat 11 rotates to the left-hand side with the hip point P as a center.

Furthermore, if the supports 22E, 22G of the seat posture driving units 20E, 20G are raised and the supports 22F, 22H of the seat posture driving units 20F, 20H are lowered, the seat 11 rotates to the rearward side with the hip point P as a center. Meanwhile, if, conversely, the supports 22E, 22G of the seat posture driving units 20E, 20G are lowered and the supports 22F, 22H of the seat posture driving units 20F, 20H are raised, the seat 11 rotates to the forward side with the hip point P as a center.

Table 9 below shows an example of relationships between the motors which are rotated to control the posture of the seats 10, 11 and the states of control, including control during a turning of the vehicle (roll control), control during an acceleration (squat control), and control during a deceleration (dive control).

TABLE 9

| Motor | | Type of Control | | | |
|---|---|---|---|---|---|
|  |  | Roll | | Squat | Dive |
|  |  | θ = R | θ = L |  |  |
| Motor | 20A, 20E | 0 | 1 | 0 | 1 |
|  | 20C, 20G | 1 | 0 | 0 | 1 |
|  | 20B, 20F | 0 | 1 | 1 | 0 |
|  | 20D, 20H | 1 | 0 | 1 | 0 |

Since Table 9 is similar to Table 1, a description thereof will be omitted.

In this embodiment, as shown in FIG. 17, switches 70A, 70B are disposed on a console box 72 in the rear of a shift lever 74. These switches 70A, 70b are used to alter corrected variables for correcting the controlled variables for the posture of the seats 10, 11. Although a detailed description will be given later, the switch 70A is used for altering the corrected variables for postural control of the driver's seat 10, while the switch 70B is used for altering the corrected variables for postural control of the passenger's seat 11.

As shown in FIG. 18, the controller 40 is configured in a manner similar to that shown in FIG. 7. In FIG. 18, points that differ from FIG. 7 are that encoders 68E, 68F, 68G, and 68H respectively disposed on motors 34E to 34H for the seat 11 are connected to the input ports 50, and that the switches 70A, 70B are also connected to the same. In this embodiment, normally-open type switches are used as the switches 70A, 70B, and as the occupants press the switches 70A, 70B, high-level signals are inputted to the input ports 50. In addition, as the occupants press the switches 70A, 70B again, this state is canceled, and low-level signals are inputted to the input ports 50. Also, the output ports 52 are connected to rotatively driving units 35E, 35F, 35G, and 35H via the amplifier 54 so as to control the motors 34E to 34H.

The memory 56 is connected to the buses 48, and tables on the correction coefficient hj (j=A, B, C, D, E, F, G, or H and corresponds to the reference character A, B, C, D, E, F, G, or H in the reference characters A-D and E-H of the motors 34A-34D and the motors 34E-34H) shown in Tables 10 to 13 below are stored in the memory 56. It should be noted that Tables 10 and 11 show correction coefficients during roll control, while Tables 12 and 13 show correction coefficients during squat/dive control. Table 10 is identical to Table 2, and correction coefficients differ between Tables 10 and 11. In addition, Table 12 is identical to Table 3, and correction coefficients differ between Tables 12 and 13. These tables are used for calculating a corrected variable H(R,L)j for correcting a controlled variable Y(R,L)j for controlling the posture of each of the seats 10, 11. In other words, the tables show relationships between the stroke sensors 66 and the controlled variables for the seat obtained from the running condition of the vehicle. It should be noted that R and L denote the driver's seat and the passenger's seat, respectively, and the controlled variable Y(R, L)j has an L value (L1-L3) and a K value (K1-K2) in correspondence with each of roll control and squat/dive control. For instance, in the example shown in Table 10, the amount of displacement dDj of the stroke sensor during roll control is $\alpha \leq dDj < \beta$, and when the vehicle speed V is a high speed (PVL), the correction coefficient hj becomes 1/10.

TABLE 10

| V | $dDj < \alpha$ | $\alpha \leq dDj < \beta$ | $\beta \leq dDj$ |
|---|---|---|---|
| ZR | 0 | 0 | 0 |
| PM | 0 | $\frac{3}{10} \cdot Lj$ | $\frac{5}{10} \cdot Lj$ |
| PL | 0 | $\frac{2}{10} \cdot Lj$ | $\frac{4}{10} \cdot Lj$ |
| PVL | 0 | $\frac{1}{10} \cdot Lj$ | $\frac{3}{10} \cdot Lj$ |

In Table 10 above, ZR, PM, PL, and PVL denote the vehicle speed V in the same way as described above; Lj denotes a controlled variable (Yf(R, L)j) for the seat during roll control; and $\alpha$ and $\beta$ are constants.

In addition, the controller 40 selects Table 10 or 11, 12 or 13 in correspondence with the on/off state of the aforementioned switches 70A, 70B, and alters the tables used. From the displacement amounts of the stroke sensors, the relationship for determining the controlled variable for the posture of the seats 10, 11 is shown in Formula (2) below.

$$Y(R, L)j = Yf(R, L)j + hj \cdot Yf(R, L)j \quad (2)$$

where Y(R, L)j is a controlled variable for each of the seats 10, 11; and Yf(R, L)j is a controlled variable for each of the seats 10, 11 determined on the basis of the steering wheel sensor 62 and the vehicle speed sensor 64 (the running condition of the vehicle).

TABLE 11

| V | $dDj < \alpha$ | $\alpha \leq dDj < \beta$ | $\beta \leq dDj$ |
|---|---|---|---|
| ZR | 0 | 0 | 0 |
| PM | $-\frac{2}{5} \cdot Lj$ | $-\frac{1}{5} \cdot Lj$ | 0 |
| PL | $-\frac{2}{5} \cdot Lj$ | $-\frac{1}{5} \cdot Lj$ | 0 |
| PVL | $-\frac{2}{5} \cdot Lj$ | $-\frac{1}{5} \cdot Lj$ | 0 |

TABLE 12

| $\theta$ | $dDj < \alpha$ | $\alpha \leq dDj < \beta$ | $\beta \leq dDj$ |
|---|---|---|---|
| ZR | 0 | 0 | 0 |
| PM | 0 | $\frac{3}{10} \cdot Kj$ | $\frac{5}{10} \cdot Kj$ |
| PL | 0 | $\frac{1}{10} \cdot Kj$ | $\frac{3}{10} \cdot Kj$ |

TABLE 13

| $\theta$ | $dDj < \alpha$ | $\alpha \leq dDj < \beta$ | $\beta \leq dDj$ |
|---|---|---|---|
| ZR | 0 | 0 | 0 |
| PM | $-\frac{5}{10} \cdot Kj$ | $-\frac{3}{10} \cdot Kj$ | 0 |
| PL | $-\frac{3}{10} \cdot Kj$ | $-\frac{1}{10} \cdot Kj$ | 0 |

It should be noted that ZR, PM, and PL denote the rotational angle $\theta$ of the steering wheel 16; Kj is the controlled variable (Yf(R, L)j) for each of the seat during squat or dive control; and $\alpha$ and $\beta$ are constants.

Next, although the controlled variables for the seat which are used in this embodiment are similar to those of the first embodiment, as shown in Tables 14 and 15, controlled variables for swinging the seat to the left or right with the hip point P as a center (see Table 14) as well as controlled variables for swinging the seat forward and backward with the hip point P as a center (see Table 15) are set in advance for both the driver's seat and the passenger's seat.

TABLE 14

| | Left Side | | Initial Position | Right Side | |
|---|---|---|---|---|---|
| | Large | Small | Neutral | Small | Large |
| Controlled variable | L3 | L2 | L1 | 0 | L1 | L2 | L3 |
| Driver's seat | LR3 | LR2 | LR1 | 0 | LR1 | LR2 | LR3 |
| Passenger's seat | LL3 | LL2 | LL1 | 0 | LL1 | LL2 | LL3 |

It should be noted that $LL_k > LR_k$ (k = 1, 2, or 3, and this is the case of a right steering wheel; in the case of a left steering wheel, the opposite is true, i.e., $LR_k > LL_k$.)

Accordingly, in the case of the right steering wheel, the controlled variables for the passenger's seat are greater than those for the driver's seat.

TABLE 15

|  | Forward Side | | Initial Position | Rear Side | |
| --- | --- | --- | --- | --- | --- |
|  | Large | Small | Neutral | Small | Large |
| Controlled variable | K2 | K1 | 0 | K1 | K2 |
| Driver's seat | KR2 | KR1 | 0 | KR1 | KR2 |
| Passenger's seat | KL2 | KL1 | 0 | KL1 | KL2 |

It should be noted that $KL_m > KR_m$ (m=1 or 2, and this is the case of a right steering wheel; in the case of a left steering wheel, the opposite is true, i.e., $KR_m > KL_m$.)

Accordingly, in the case of the right steering wheel, the controlled variables for the passenger's seat are greater than those for the driver's seat.

It should be noted that the controlled variables above are listed only with respect to cases where seat posture control is effected in the positive direction (in a direction in which the support of each seat posture driving unit is raised).

In this embodiment, fuzzy inference is employed to calculate the controlled variables for the posture of each of the seats 10, 11, in the same way as in the first embodiment. The fuzzy inference rules in this embodiment are similar to those of Table 6, but differ from the same in that two seats are controlled simultaneously.

An example of the fuzzy inference rules for roll control when the vehicle in accordance with this embodiment is made to turn is shown below.

(a) to (d) If the rotational angle of the steering wheel is small, then no postural control is effected for the seats 10, 11.

(g) If the steering wheel is turned clockwise by a medium degree, and if the vehicle speed V is a medium-high speed and the angular velocity of the steering wheel is small, then the seats 10, 11 are inclined slightly to the right.

(f) If the steering wheel is turned clockwise by a medium degree, and if the vehicle speed V is a medium-low speed and the angular velocity of the steering wheel is small, then no postural control is effected for the seats 10, 11.

(k) If the steering wheel is turned clockwise by a medium degree, and the vehicle speed V is a medium-high speed and the angular velocity of the steering wheel is large, then the seats 10, 11 are inclined to the right by a medium degree.

(t) If the steering wheel is turned clockwise by a large degree, and the vehicle speed V is a high speed and the angular velocity of the steering wheel is large, then the seats 10, 11 are inclined to the right by a large degree.

The membership functions corresponding to these linguistic values are shown in FIGS. 8A to 8F already referred to.

In this embodiment, the controlled variables L1, L2, and L3 for the posture are set for each of the driver's seat 10 and the passenger's seat 11 (see Table 14). In addition, when control is effected for inclining the seat 10 to the left or right, as described above, the seat 10 is swung to the left or right with the hip point P as a center, so that the amount of displacement on the right-hand side of the seat 10 and the amount of displacement on the left-hand side thereof become identical amounts symmetrical with respect to the reference position. For this reason, it suffices if the controlled variables for the posture are determined for either the left- or right-hand side alone. For instance, in a case where the seat 10 is inclined to the right by L1, it suffices if the controlled variables for the right-hand seat posture driving units 20A, 20B are set to $-LR1$, and the controlled variables for the left-hand seat posture driving units 20C, 20D are set to LR1. Meanwhile, in a case where the seat 10 is inclined to the left by L1, it suffices if the controlled variables for the right-hand seat posture driving units 20A, 20B are set to LL1, and the controlled variables for the left-hand seat posture driving units 20C, 20D are set to $-LL1$.

In this embodiment, the controlled variables for the posture of the seats 10, 11 are determined by conducting fuzzy inference on the basis of the above-described fuzzy rules and membership functions, and the control routine shown in FIG. 15 is used in a manner similar to that in the first embodiment.

In this embodiment, in Step 162 in FIG. 15, the controlled variable is set to any one of 0, LR1, LR2, and LR3 with respect to the seat 10, whereas the controlled variable is set to any one of 0, LL1, LL2, and LL3 with respect to the seat 11. Then, the respective controlled variables for the seat posture driving units 20A to 20H of the seat 10 are calculated in correspondence with the controlled variables thus determined. Namely, as already described, if, for instance, the seat 10 is inclined to the left or right, the controlled variables SR0 for the seat posture driving units 20A, 20B as well as the controlled variables SL0 for the seat posture driving units 20C, 20D are calculated. When the seat 11 is inclined to the left or right, the controlled variables SR1 for the seat posture driving units 20E, 20F as well as the controlled variables SL1 for the seat posture driving units 20G, 20H are calculated.

Next, in squat/dive control when the vehicle is accelerated or decelerated, in this embodiment the only difference lies in that the two seats are controlled, and the fuzzy inference rules are similar to those shown in Table 7 of the first embodiment. An example is shown as follows:

(a), (d), (i), and (m) If the acceleration dV is small, then no postural control is effected for the seats 10, 11.

(e) If the acceleration dV has increased slightly, and if the vehicle speed V is the medium-low speed, then no front-side postural control is effected for the seats 10, 11, and the rear sides of the seats 10, 11 are raised slightly.

(n) If the acceleration dV has increased by a large degree and the vehicle speed V is the high speed, then the front sides of the seats 10, 11 are lowered slightly, and the rear sides of the seats 10, 11 are raised by a large degree.

(h) If the acceleration dV has decreased slightly and the vehicle speed V is the medium-high speed, then no front-side postural control is effected for the seats 10, 11, and the rear sides of the seats 10, 11 are lowered slightly.

(l) If the acceleration dV has decreased by a large degree and the vehicle speed V is the high speed, then the front sides of the seats are raised by a large degree, and the rear sides of the seats 10, 11 are lowered by a large degree.

To determine the controlled variables for the posture in squat control or dive control of the seats 10, 11 by conducting fuzzy inference on the basis of the above-described fuzzy rules and membership functions, it suffices if determinations are made in a manner similar to the manner described earlier.

In this embodiment, in the same way as in the first embodiment, after calculation of the controlled variables for the seats 10, 11 by utilizing the fuzzy inference described above, the interruption subroutine is executed at each predetermined time. A description will be given hereafter of this interruption subroutine.

Figure 19:
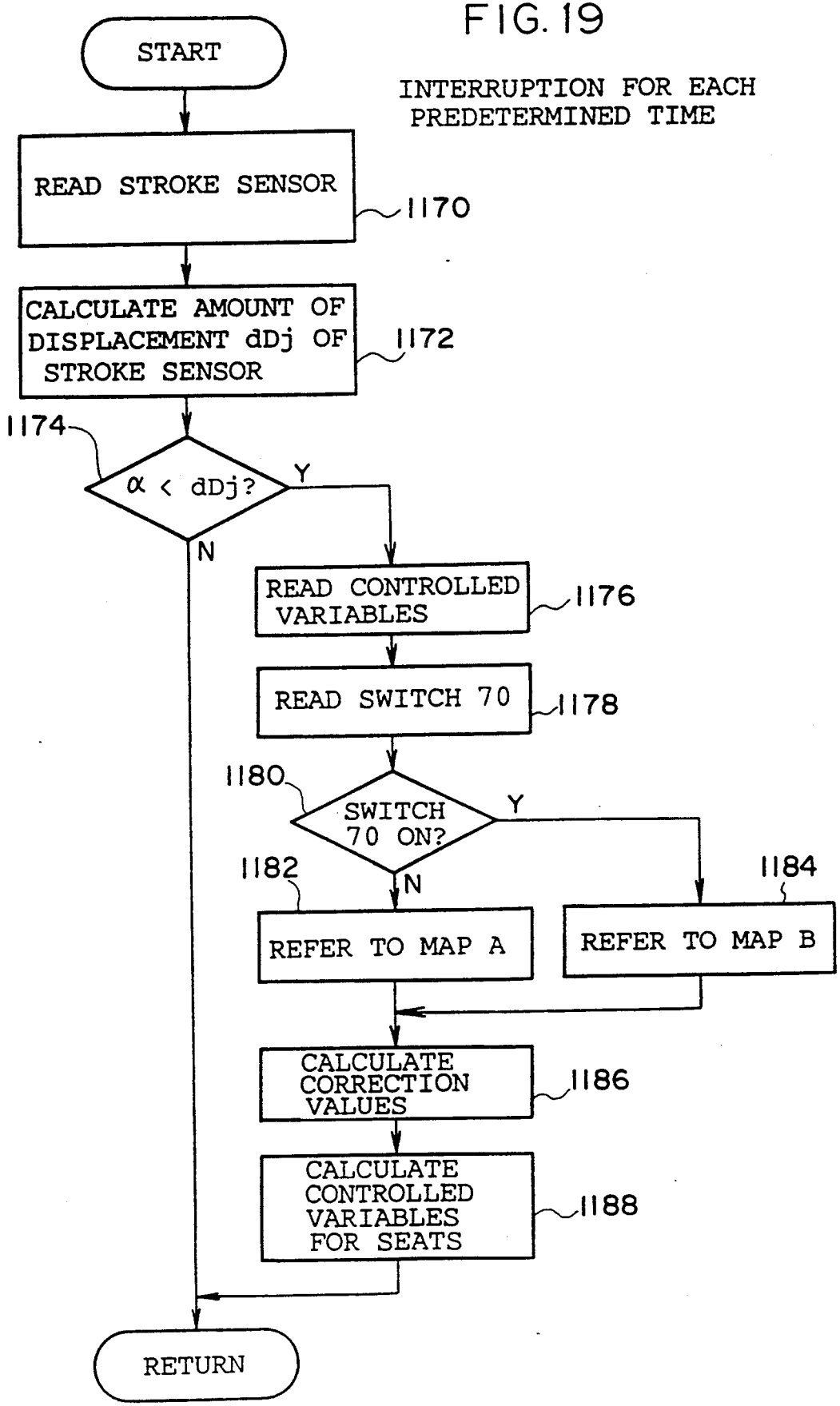
FIG. 19 is a flowchart illustrating a subroutine for interrupt processing in accordance with the second embodiment.

As shown in FIG. 19, when the interruption subroutine is started, Step 1170 is executed. In Step 1170, strokes Dj (j=A, B, C, or D) of the stroke sensors 66A to 66D are read, and the operation proceeds to Step 1172. In Step 1172, the amount of displacement dDj is calculated for each suspension unit, and the operation proceeds to Step 1174. In Step 1174, a determination is made as to whether or not the amounts of displacement of all the stroke sensors 66A to 66D are such that $\alpha < dDj$. If the amounts of displacement of all the stroke sensors 66A to 66D are such that $\alpha \geq dDj$, a determination is made that the posture of the vehicle has not undergone a displacement. Hence, this interruption subroutine is ended without correcting the controlled variables for the seats 10, 11. However, if the amount of displacement of any one of the stroke sensors 66A to 66D is such that $\alpha < dDj$, a determination is made that the posture of the vehicle has undergone a displacement, and the operation proceeds to Step 1176 to fetch the controlled variables (Ki, Li) for the posture determined in the above-described routine. At that time, the vehicle speed V and the rotational angle $\theta$ of the steering wheel 16 are also fetched. In addition, the vehicle speed V and the rotational angle $\theta$ of the steering wheel 16 are made to correspond to ZR, PM, PL, and PVL as they become greater by predetermined amounts. Upon completion of the fetching, the operation proceeds to Step 1178 to read the on/off state of the switches 70A, 70B, and the operation proceeds to Step 1180. In Step 1180, a determination is made as to whether or not the switches 70A, 70B are on, and if they are on, the operation proceeds to Step 1184 so as to refer to Table 11 in the case of roll control or Table 13 in the case of squat or dive control. Meanwhile, when the switches 70A, 70B are off, the operation proceeds to Step 1182 to refer to Table 10 in the case of roll control or Table 12 in the case of squat or dive control. Upon completion of the reference to the table, controlled variables are calculated from the table referred to in Step 1186, and the operation proceeds to Step 1188. In Step 1188, after the controlled variables for the posture of the seat 10 are calculated in accordance with Formula (2) above, the contents of the controlled variables (Ki, Li) for the posture determined in Step 116 of FIG. 13 are rewritten by these corrected controlled variables, thereby completing this interruption subroutine.

As a result, in the control of the posture of the seats 10, 11, the controlled variables are altered to those to be applied after the displacement of the vehicle, and the seats are moved to the positions thus altered.

Accordingly, for instance, during the above-described roll control, when the controlled variable for the seat obtained from fuzzy inference is L1, the controlled variable for the left-hand side of the driver's seat is set to LR1, and the controlled variable for the right-hand side thereof is set to −LR1. At that time, when the amount of displacement of the stroke sensor exceeds the predetermined value $\alpha$, the controlled variable i calculated in accordance with Formula (2) above. Namely, if the vehicle speed V is assumed to be PM, when the switch 70A is off, 3/10 is obtained as the correction coefficient (see Table 10). As a result, the controlled variable of the posture of the steering wheel 10 becomes 13/10 in accordance with Formula (2) above. Thus, the controlled variables for the seat posture can be calculated from the amounts of the running condition of the vehicle based on the rotational angle of the steering wheel, the angular velocity of the steering wheel, the vehicle speed, and the acceleration. At the same time, the controlled variables once calculated can be corrected in a direction in which the change in the vehicle's posture is offset in correspondence with the change in the vehicle's posture.

Meanwhile, when the switch 70A is on, −1/5 is obtained as the correction coefficient (see Table 11). As a result, the controlled variable for the posture of the seat 10 becomes 4/5 in accordance with Formula (2) above. Thus, when the values for controlling the seat posture are calculated from the aforementioned amounts of the running state of the vehicle, and the controlled variables are corrected in a direction in which the change in the vehicle's posture is offset in correspondence with the change in the vehicle's posture, it is possible to alter the corrected variables such that the corrected variables are reduced.

Although a description has been described above with respect to the seat 10, the same holds true of the seat 11 as well. In addition, although a description has been given above of roll control, corrections are performed in a similar manner in squat/dive control as well.

Thus, since the controlled variables for the posture of the driver's seat and the passenger's seat can be altered by the turning on and off of the switches 70A, 70B, it is possible to adjust an amount of discordance between the information stored in the occupant's brain and the sense information. Consequently, it is possible to secure an optimum seat position and prevent carsickness. For the driver, a posture which facilitates driving can be secured. In addition, since fuzzy control is employed in the above-described postural control of the seats, it is possible to provide control which is fitted to the driver's feeling. At the same time, since control is effected transversely symmetrically about the hip point P located at the seat during roll control, the amount of vertical vibration of the driver's eyes is reduced, so that driving becomes stabilized.

Although a description has been given of an example in which the corrected variables are calculated in correspondence with the vehicle speed V and the rotational angle $\theta$ of the steering wheel 16, the corrected variables may be determined by using fuzzy inference.

Although, in the foregoing embodiment, a description has been given of an example in which the controlled variables for the seat posture are calculated from the amounts of the running condition of the vehicle determined on the basis of the steering wheel sensor 62 and the vehicle speed sensor 64, an amount of inertia may be calculated by using a vehicle-behavior sensor such as a G (acceleration) sensor.

Although, in the foregoing embodiment, a description has been given of an example in which the controlled variables for the seat posture are altered by means of switches, the present invention is not limited to the arrangement based on the on-off switching operation of the switches or the like. For instance, a plurality of corrected variables may be selected by means of a multistage switch or the like, or the corrected variable may be altered continuously by means of a variable switch.

Referring now to FIGS. 20 to 24, a detailed description will be given of a third embodiment of the present invention. In this embodiment, the structure of the seat, the structure of the controller, the controlled variables for the seat, fuzzy inference for roll control, and fuzzy inference rules for squat/dive control are similar to those of the first embodiment and, therefore, a description thereof will be omitted.

Figure 23A:
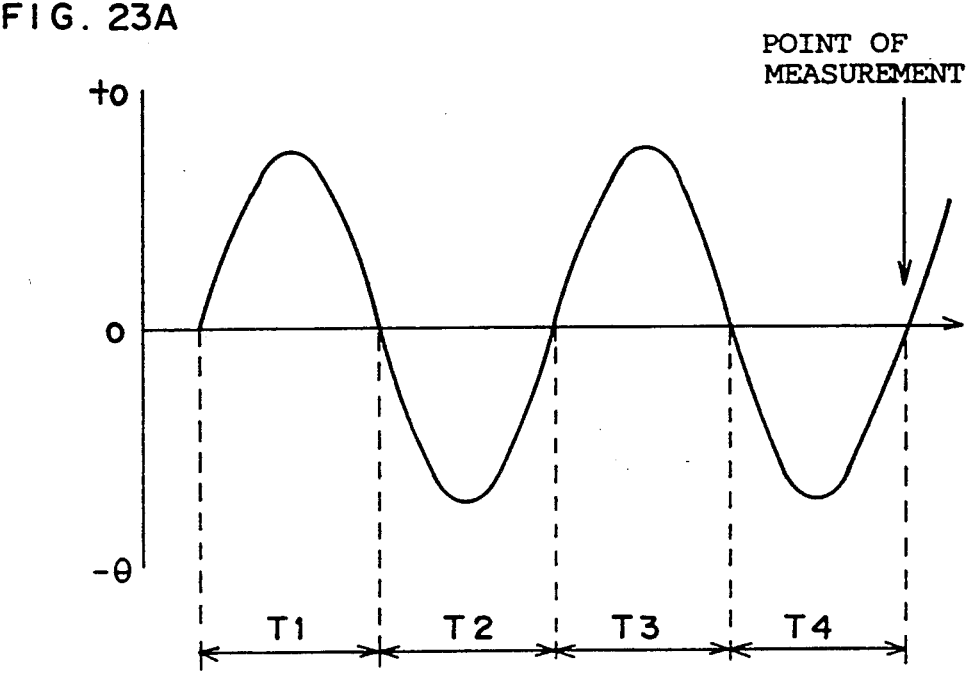
FIGS. 23A and 23B are diagrams illustrating the relationship between the steering angle of the steering wheel and the operating time.
Figure 23B:
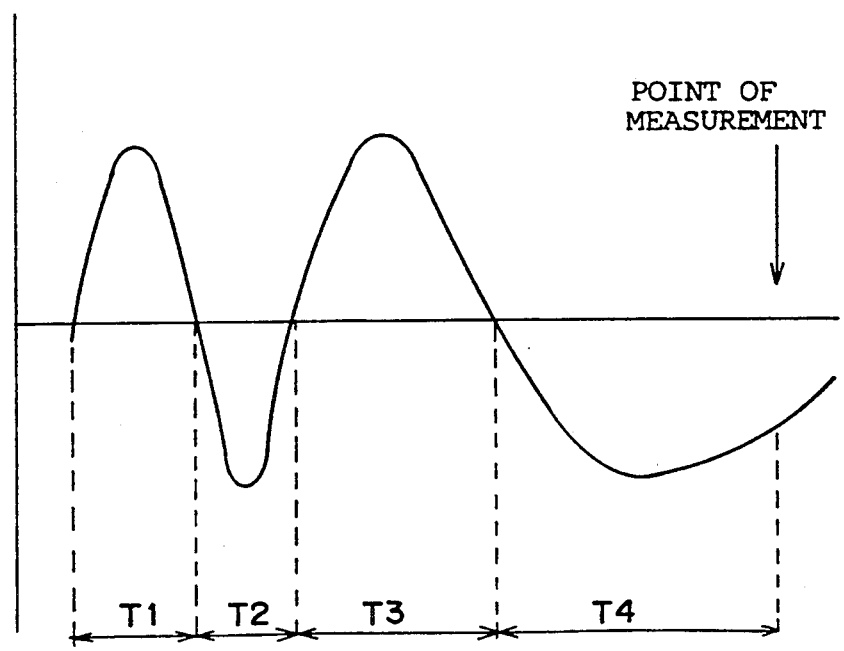

A description will be given hereafter of the fuzzy inference rules for correction control in accordance with this embodiment. When the roll control described in the foregoing embodiments is effected while driving on a rough road or making a lane change, there are cases where the occupant feels discomfort. Accordingly, in this embodiment, the angular velocity $d\theta$ of the steering wheel and a steering period are used as amounts of the steering condition of the vehicle, the correction coefficient hj is determined on the basis of the angular velocity $d\theta$ of the steering wheel and the steering period, and the controlled variable for the seat (roll control) determined as described above is corrected by means of this correction coefficient hj. An average time T of time durations during which the steering wheel periodically passes through a neutral point is used as the steering period. As shown in FIG. 23A, this average time T is obtained by averaging three time durations (T1, T2, T3) divided by neutral points immediately preceding a neutral point of steering located immediately before a point of time of measurement. In addition, in a case where an elapsed time duration T4 from the neutral point located immediately before the point of time of measurement until the point of time of measurement exceeds the average time T, the average time T is obtained from the time duration T4 and the immediately preceding two time durations (T2, T3). As a result, even in a case where the present steering operation is undergoing a transition to a slowly changing state, the average time T can be determined within a short period of time and can be reflected on the calculation.

To effect this correction, a final controlled variable Yj for the seat is determined by multiplying the controlled variable Yfj for the seat determined on the basis of the running condition of the vehicle by the correction coefficient hj, and the seat is controlled by using this final controlled variable Yj for the seat.

$$Yj = hj \cdot Yfj \qquad (3)$$

where
Yj: final controlled variable for the seat
Yfj: controlled variable for the seat determined on the basis of the running condition of the vehicle In this embodiment, fuzzy inference is employed to obtain the aforementioned correction efficient hj. Table 16 shows fuzzy inference rules for correcting roll control when the vehicle undergoes a turn.

TABLE 16

| T | $d\theta$ | | |
|---|---|---|---|
| | ZR | PM | PL |
| PL | (a) PL | (b) PM | (c) PM |
| PM | (d) PM | (e) PS | (f) PS |

TABLE 16-continued

| T | $d\theta$ | | |
|---|---|---|---|
| | ZR | PM | PL |
| ZR | (g) PM | (h) ZR | (i) ZR |

In Table 16, $d\theta$ is the angular velocity of the steering wheel; T is the average time during which the steering wheel periodically passes through the neutral point; and (a) to (i) denote the numbers of the fuzzy inference rules. In addition, ZR, PM, and PL represent linguistic values concerning the angular velocity of the steering wheel, as described above, respectively representing that average times ZR, PM, and PL concerning the average time T during which the steering wheel periodically passes through the neutral point are small, medium, and large. In addition, ZR, PS, PM, and PL concerning the corrected variable for correcting the postural control of the seat denote linguistic values representing that no correction is made, a slight correction is made, a correction is made by a medium degree, and a correction is made by a large degree, respectively.

If the aforementioned fuzzy inference rules are expressed in the form of "if ... then ...," the rules (c) and (f), for example, can be described as below. Since the other fuzzy rules among the rules (a) to (n) can be expressed in a similar manner, a description thereof will be omitted.

(c) If the angular velocity $d\theta$ of the steering wheel is large and the average time T during which the steering wheel periodically passes through the neutral point is large, the correction of the controlled variable is performed by a medium degree.

(f) If the angular velocity $d\theta$ of the steering wheel is large and the average time T during which the steering wheel periodically passes through the neutral point is medium, the correction of the controlled variable is performed slightly.

The linguistic values ZR, PM, and PL of the average time T during which the steering wheel periodically passes through the neutral point are quantified by a membership function Ft shown in FIG. 20A. ZR is a characteristic in which as the average time T increases from 0 to T1, the degree of membership decreases from 1 to 0. PM is a characteristic in which as the average time T increases from 0 to T1, the degree of membership increases from 0 to 1, and as the average time T increases from T1 to T2, the degree of membership decreases from 1 to 0. PL is a characteristic in which as the average time T increases from T1 to T2, the degree of membership increases from 0 to 1, and becomes 1 at T2 or more.

The linguistic values ZR, PS, PM, and PL concerning the corrected values of the consequents are quantified by a membership function Gh shown in FIG. 20B. ZR is a characteristic in which when the corrected variable is 0, the degree of membership is 1. PS is a characteristic in which as the corrected variable increases from 0 to h1, the degree of membership increases from 0 to 1, and as the corrected variable increases from h1 to h2, the degree of membership decreases from 1 to 0. PM is a characteristic in which as the corrected variable increases from h1 to h2, the degree of membership increases from 0 to 1, and as the corrected variable increases from h2 to h3, the degree of membership decreases from 1 to 0. PL is a characteristic in which as the corrected variable increases from h2 to h4, the degree of membership increases from 0 to 1, and is thereafter held at 1.

Next, a description will be given of an example in which the corrected variable is determined through fuzzy inference in a case where the controlled variable for the seat during a turn of the vehicle (roll controlled variable) is corrected. For the sake of simplification, a description will be given by citing fuzzy inference on the basis of two rules (c) and (f) in Table 16.

Figures 24A, 24B, 24C, 24D:
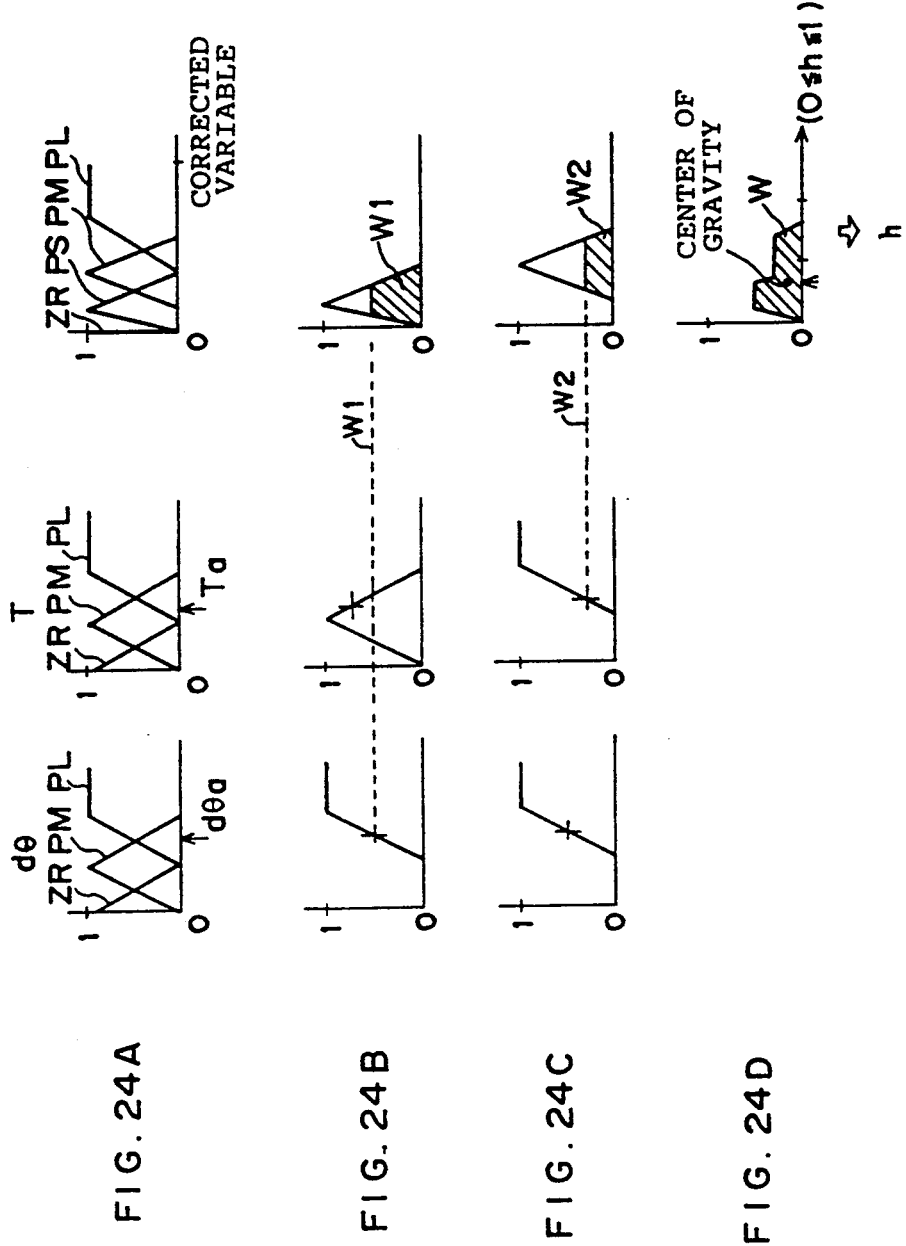
FIG. 24A is a diagram illustrating membership functions.
FIGS. 24B and 24C are image diagrams illustrating the fuzzy inference process.
FIG. 24D is an image diagram illustrating a result of fuzzy inference.

If it is assumed that the angular velocity $d\theta$ of the steering wheel 16 is $d\theta a$, and the average time T is Ta (see FIG. 24A), as shown in FIG. 24B, in the rule (f), the degree of membership is calculated by PL with respect to the angular velocity dqa of the steering wheel 16, while the degree of membership is calculated by PM with respect to the average time T. Similarly, in the rule (c), the degree of membership is calculated by PL with respect to the angular velocity $d\theta a$ of the steering wheel 16, and by PL with respect to the average time T. Then, with respect to each of the above-described rules, an AND of the degrees of membership, i.e., a minimum value of the degree of membership, is calculated as the goodness of fit w1 (see FIG. 24B) and w2 (see FIG. 24C), respectively.

Then, a result of inference is calculated for each of the aforementioned rules (f) and (c). That is, sets in which the membership functions for quantifying the corrected variables are respectively weighted by the goodness of fit w1 and w2 are determined. In this case, in the rule (f), a set W1, in which PS is cut off by the goodness of fit w1 and which is indicated by a shadowed portion, is determined as shown in FIG. 24B. In the rule (c), a set W2, in which PM is cut off by the goodness of fit w2 and which is indicated by a shadowed portion, is determined as shown in FIG. 24C. Then, a result of inference (set W) is determined through a sum of sets of the inferred results (sets W1, W2) calculated for the respective rules. Namely, the set W indicated by a shadowed portion is obtained as a result of fuzzy inference by combining the set W1 in the shadowed portion and the set W2 in the shadowed portion (see FIG. 24D).

Then, the center of gravity of this set W is determined, and a value corresponding to the center of gravity thus determined becomes the correction coefficient hj for controlling the seat.

Thereafter, since a control routine similar to that for the first embodiment is used, a description will be omitted with respect to portions which are similar to those of the first embodiment, and only the differences will be described. First, a description will be given of an initialization subroutine in accordance with this embodiment. In this embodiment, as described in the first embodiment, after the controlled variables for the seat are calculated through fuzzy inference, the controlled variables for the seat are corrected in correspondence with the steering condition. That is, after calculation of the controlled variables for the seat, an interruption subroutine for correcting the controlled variables for the seat is executed at each predetermined time. A description will be given hereafter of this interruption subroutine.

Figure 21:
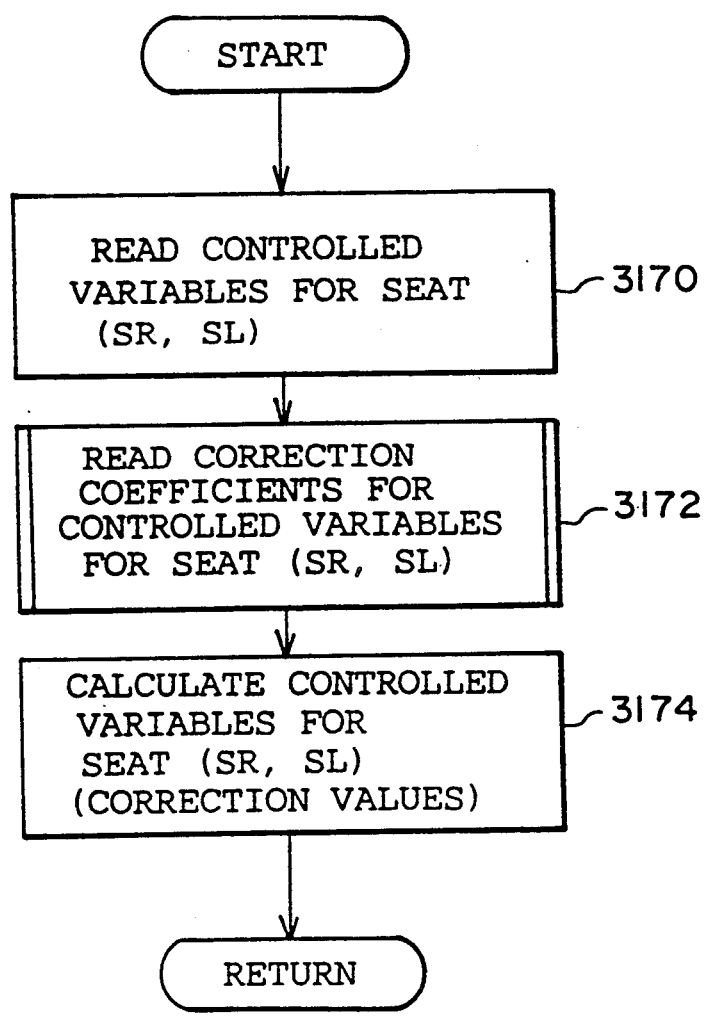
FIG. 21 is a flowchart illustrating a subroutine for interrupt processing in accordance with the third embodiment.

As shown in FIG. 21, when the interruption subroutine is started, Step 3170 is executed. In Step 3170, the controlled variable Yfj for the seat determined by the above-described fuzzy inference is read, and the operation proceeds to Step 3172. In Step 3172, the above-described correction coefficient hj is calculated through the above-described fuzzy inference (FIG. 22), and the operation proceeds to Step 3174. In Step 3174, the final controlled variable Yj for the seat is calculated on the basis of Formula (3). Subsequently, the controlled variable Yfj for the seat determined through the fuzzy inference on the basis of the steering condition of the vehicle is rewritten by the final controlled variable Yj for the seat thus corrected, thereby completing this subroutine.

Figure 22:
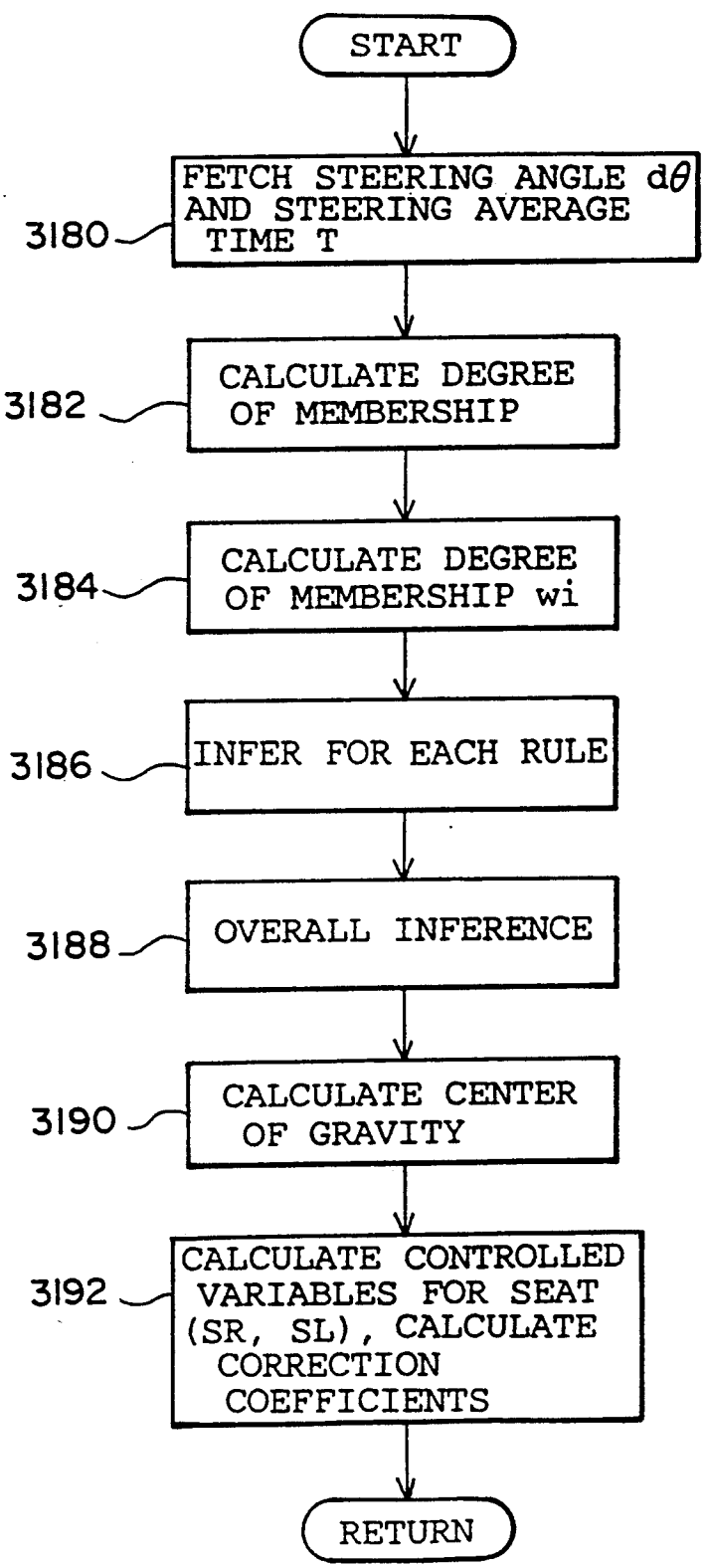
FIG. 22 is a flowchart illustrating a subroutine for arithmetic processing of a correction coefficient for seat control in the control routine in the third embodiment.

A detailed description will be given of this Step 3172. As shown in FIG. 22, the angular velocity $d\theta$ of the steering wheel 16 and the average time T are fetched (Step 3180). Then, the degree of membership corresponding to the angular velocity $d\theta$ of the steering wheel 16 and the average time T, which constitute the antecedents of the fuzzy inference rule, is calculated in accordance with each fuzzy inference rule described above (Step 3182). An AND of the degree of membership, i.e., a minimum wi (i denotes the number of the rule concerned) of the degree of membership, namely, the goodness of fit concerning the angular velocity $d\theta$ of the steering wheel 16 and the average time T is calculated (Step 3184). A set (AND) Wi, in which the membership functions of the consequents corresponding to the respective rules for quantifying the state of correction of the seat control are weighted by the goodness of fit wi, is determined (Step 3186). From the results of inference (sets Wi) calculated for the respective rules, the result of inference (set W) is determined (Step 3188). Then, the center of gravity of this set W is determined (3190), and the correction coefficient hj for the seat corresponding to the value of the center of gravity thus obtained is determined (Step 3192).

Accordingly, the postural control of the seat is corrected in correspondence with the angular velocity of the steering wheel and the average time during which the steering wheel periodically passes through the neutral point, and the seat is controlled in such as manner as to correspond to the controlled variable for the seat thus corrected. Thus, first of all, since the values for controlling the seat posture are calculated directly from the amounts of the running condition of the vehicle based on the rotational angle of the steering wheel, the angular velocity of the steering wheel, the vehicle speed, and the acceleration of the vehicle, it is possible to calculate the controlled variables for the seat for displacing the seat posture at an early stage. At the same time, since correction is effected in such a manner as to suspend or restrict control in a direction in which an inertial force acting on the occupant is held appropriately on the basis of the steering condition of the vehicle, control can be provided to move the seat to a position which allows the occupant to feel comfortable.

Although, in the above-described embodiment, a description has been given of an example in which the controlled variables for the seat posture are determined from the running condition of the vehicle obtained on the basis of the steering wheel sensor 62 and the vehicle speed sensor 64, the present invention can be applied to a case where the running condition of the vehicle is determined by means of a vehicle-behavior sensor, such as a yaw-rate sensor. In such a case, after the controlled variables for the seat posture are calculated on the basis of values detected by the yaw-rate sensor, if the controlled variables for the posture calculated in correspondence with a yaw rate or the period of a yaw rate or a central-point passage time, control can be provided to move the seat to a position which allows the occupant to feel comfortable.

In addition, although, in the foregoing embodiments, a description has been given of fuzzy inference based on AND operations in which a minimum value of the degree of membership is set as the goodness of fit, it is possible to use an example in which the goodness of fit is determined by calculating a product of the degrees of membership (fuzzy inference based on an algebraic product). Furthermore, it is possible to use other combination rules of fuzzy inference for determining the goodness of fit on the basis of the degree of membership.

In the above-described embodiment, a description has been given of an example in which values for controlling the seat posture are calculated directly from the amounts of the running condition of the vehicle based on the rotational angle of the steering wheel, the angular velocity of the steering wheel, the vehicle speed, and the acceleration of the vehicle, and the values are corrected on the basis of the angular velocity of the steering wheel and the steering-wheel neutral-point passing time. Alternatively, the present invention can readily be applied to a case where the seat posture is displaced at an early stage in correspondence with the controlled variables for the seat determined, and if the posture of the vehicle undergoes a change, the controlled variables once calculated are corrected in a direction in which the change in the vehicle's posture is held appropriately in correspondence with the change in the vehicle's posture.

Although, in the foregoing embodiments, a description has been given of a case where the present invention is applied to a driver's seat of an automobile, it is to be understood that these embodiments are not limited to the type of vehicle and the position of the seat. Namely, the present invention is applicable to all types of vehicles having a seat(s). As for the positions of the seats, the apparatus of the invention may be used for a combination of the driver's seat and a rear seat in addition to the passenger's seat in the front. In addition, although, in the foregoing embodiments, a description has been given of control of the seatback and the seat cushion, at least one of the headrest and lumber support may also be controlled simultaneously.

What is claimed is:

1. A system for accommodating a sitting attitude of vehicle occupants in accordance with a varied vehicle operating condition and vehicle attitude, comprising in combination:

means for sensing values of a vehicle operating condition;

means for sensing values of a vehicle attitude;

means for computing values of motion in a sitting attitude in correspondence with said vehicle operating condition and said vehicle attitude to determine an appropriate sitting attitude with respect to each seat in which occupants are seated, said computing means including means for calculating a controlled variable for said sitting attitude, storage means for storing a plurality of values of a corrected variable for correcting said controlled variable for said sitting attitude, selecting means for selecting an optimum value of said corrected variable from said storage means, said controlled variable being computed for said sitting attitude with respect to each seat in which occupants are seated based on said vehicle attitude and said corrected variable selected, said seats in which said occupants are seated are two seats including a driver's seat, and said computing means determines said appropriate sitting attitude whose values differ with respect to respective seats; and means for adjusting said sitting attitude in accordance with said values of motion determined by said means for computing to correspond to said appropriate sitting attitude based on said vehicle operating condition and said vehicle attitude.

2. A system according to claim 1, wherein said computing means determines said appropriate sitting attitude in such a manner that said controlled variable for said sitting attitude of a passenger become greater than said sitting attitude of said driver when a right-steering-wheel vehicle turns, and determines said controlled variable in such a manner that an opposite in true when a left-steering-wheel vehicle turns.

3. A system for accommodating a sitting attitude of vehicle occupants in accordance with a varied vehicle operating condition and vehicle attitude, comprising in combination:

means for sensing values of a vehicle operating condition;

means for sensing values of a vehicle attitude;

means for computing values of motion in a sitting attitude in correspondence with said vehicle operating condition and said vehicle attitude to determine an appropriate sitting attitude with respect to each seat in which occupants are seated, said computing means including comparing means for comparing said values of said vehicle attitude with a predetermined value and correcting means for correcting a controlled variable for said sitting attitude based on a result of a comparison by said comparing means, wherein said computing means corrects said controlled variable for said sitting attitude of each of said seats in a case where said values of said vehicle attitude sensed has exceeded said predetermined value; and means for adjusting said sitting attitude in accordance with said values of motion determined by said means for computing to correspond to said appropriate sitting attitude based on said controlled variable for said sitting attitude as corrected by said correcting means which is based in turn on said vehicle operating condition and said vehicle attitude.

4. A system for accommodating a sitting attitude of a vehicle occupant in accordance with a varied vehicle operating condition and a vehicle attitude, comprising:

first sensing means for detecting a vehicle operating condition;

second sensing means for detecting a vehicle attitude;

computing means for computing values of motion in said sitting attitude in correspondence with said vehicle operating condition to determine an appropriate sitting attitude with respect to each seat in which said vehicle occupant is seated; and adjusting means for adjusting said sitting attitude in accordance with said determined values of said appropriate sitting attitude based on said vehicle operating condition and said vehicle attitude.

5. A system according to claim 4, wherein said computing means includes:

means for calculating a controlled variable for said sitting attitude based on said vehicle operation condition;

storage means for storing a plurality of values of a corrected variable for correcting said controlled variable for said sitting attitude; and selecting means for selecting an optimum value of said corrected variable from said storage means, wherein said calculating means computes said controlled variable for said sitting attitude with respect to each seat in which occupants are seated based on said vehicle attitude detected by said second sensing means and said value of said corrected variable selected.

6. A system according to claim 4, wherein said computing means comprises:

comparing means for comparing said values of said vehicle attitude with a predetermined value; and correcting means for correcting said values of motion based on a result of a comparison by said comparing means, and said adjusting means adjusts said sitting attitude based on said corrected values of motion for said sitting attitude.

7. A system according to claim 6, wherein said computing means corrects said values of motion in said sitting attitude for each of said seats in said vehicle when said values of said vehicle attitude detected by said second sensing means exceed said predetermined value.

8. A system according to claim 6, wherein said second sensing means includes a stroke sensor associated with each wheel of said vehicle, wherein each stroke sensor outputs a signal corresponding to a displacement between a body of said vehicle and said associated wheel.

9. A system for accommodating a sitting attitude of vehicle occupants in accordance with a varied vehicle operating condition, comprising:

first sensing means for detecting a vehicle operating condition;

computing means for computing values of motion in said sitting attitude in correspondence with said vehicle operating condition to determine an appropriate sitting attitude with respect to each seat in which said vehicle occupants are seated; and adjusting means for adjusting said sitting attitude in accordance with said determined values of said appropriate sitting attitude, wherein said seats in which said occupants are seated are two seats including a driver's seat, and said computing means determines said appropriate sitting attitudes whose values differ with respect to said respective seats.

10. A system according to claim 9, wherein said computing means determines said appropriate sitting attitude in such a manner that said values of motion for said sitting attitude of a passenger become greater than said sitting attitude of said driver when a right-steering-wheel vehicle turns, and determines said controlled variable in such a manner that the opposite in true when a left-steering-wheel vehicle turns.

11. A system according to claim 9, further comprising:

second sensing means for detecting a vehicle attitude, wherein said computing means calculates said change in said position of each seat based on said vehicle operating condition detected by said first sensing means and said vehicle attitude detected by said second sensing means.

12. A system for accommodating a sitting attitude of vehicle occupant in accordance with a varied vehicle operating condition and a vehicle attitude, comprising:

first sensing means for detecting a vehicle operating condition;

second sensing means for detecting a vehicle attitude;

computing means for computing values of motion in said sitting attitude in correspondence with said vehicle operating condition to determine an appropriate sitting attitude of said occupant; and adjusting means for adjusting said sitting attitude in accordance with said determined values of said appropriate sitting attitude, wherein said adjusting means inclines a seat in a direction in which said vehicle turns, and said adjusting means changes a degree of inclination of said seat in correspondence with a steering angle, an angular velocity of steering, and a vehicle speed.

13. A system for accommodating a sitting attitude of a vehicle occupant in accordance with a varied vehicle operating condition and vehicle attitude, comprising:

first sensing means for detecting a steering condition of a vehicle;

second sensing means for detecting values of a vehicle attitude;

computing means for computing values of motion is said sitting attitude for appropriately holding an inertial force acting on said occupant seated in said a seat in correspondence with said values of said vehicle attitude;

correcting means for correcting said values of motion in said sitting attitude in correspondence with said steering condition of said vehicle; and adjusting means for adjusting said sitting attitude based on said values of motion in said sitting attitude corrected by said correcting means, wherein said correcting means corrects said values of motion in said sitting attitude to one of a predetermined value or below said predetermined value.

14. A system for accommodating a sitting attitude of a vehicle occupant in accordance with a varied vehicle operating condition and vehicle attitude, comprising:

first sensing means for detecting a steering condition of a vehicle;

second sensing means for detecting values of a vehicle attitude;

computing means for computing values of motion is said sitting attitude for appropriately holding an inertial force acting on said occupant seated in said a seat in correspondence with said values of said vehicle attitude;

correcting means for correcting said values of motion in said sitting attitude in correspondence with said steering condition of said vehicle; and adjusting means for adjusting said sitting attitude based on said values of motion in said sitting attitude corrected by said correcting means, wherein said correcting means corrects said values of motion in said sitting attitude in correspondence with an angular velocity of a steering wheel and a steering period which is defined as a time period corresponding to an average of time durations during which said steering wheel passes through a neutral point over a predetermined period of time.

15. A system for accommodating a sitting attitude of a vehicle occupant in accordance with a varied vehicle operating condition and vehicle attitude, comprising:

first sensing means for detecting a steering condition of a vehicle;

second sensing means for detecting values of a vehicle attitude;

computing means for computing values of motion is said sitting attitude for appropriately holding an inertial force acting on said occupant seated in said a seat in correspondence with said values of said vehicle attitude;

correcting means for correcting said values of motion in said sitting attitude in correspondence with said steering condition of said vehicle; and adjusting means for adjusting said sitting attitude based on said values of motion in said sitting attitude corrected by said correcting means, wherein said correcting means corrects said values of motion in said sitting attitude to one of a first predetermined value or a value below said first predetermined value when one of an angular velocity of a steering wheel corresponds to least a second predetermined value and a steering period, which is defined as a time period corresponding to an average of the time durations during which said steering wheel passes through a neutral point over a predetermined period of time, is at one of a third predetermined value or a value less than said third predetermined value or a yaw rate corresponds to at least a fourth predetermined value and said steering period is at one of a fifth predetermined value or a value less than said fifth predetermined value.

16. A system for adjusting a position of a seat, comprising:

first sensing means for detecting a vehicle operating condition;

second sensing means for detecting a vehicle attitude;

computing means for calculating a value for a change in a position of said seat so as to provide an appropriate sitting attitude of a vehicle occupant seated thereon, said value of said change in said position of said seat being based said vehicle operating condition detected by said first sensing means and said vehicle attitude detected by said second sensing means; and adjusting means for altering said position of said seat in accordance with said value of said change in said position of said seat calculated by said computing means, thereby adjusting a sitting attitude of said vehicle occupant to an appropriate position based on said vehicle operating condition and said vehicle attitude.

17. A system for independently adjusting a position of a plurality of vehicle seats, comprising:

first sensing means for detecting a vehicle operating condition;

computing means for calculating a value of a change in a position of each seat so as to provide an appropriate sitting attitude in said vehicle occupant seated thereon, said value of said change in said position of each seat being based on said vehicle operating condition detected by said first sensing means and said value of said change being determined independently with respect to each of said vehicle seats; and adjusting means for independently altering said position of each of said vehicle seats in accordance with said value of said change in said position of each seat calculated by said computing means, wherein said seats whose position is altered include a driver's seat.

18. A system for accommodating a sitting attitude of a vehicle occupant in accordance with a varied vehicle operating condition and vehicle attitude, comprising:

first sensing means for detecting a steering condition of a vehicle;

second sensing means for detecting values of a vehicle attitude;

computing means for computing values of motion is said sitting attitude for appropriately holding an inertial force acting on said occupant seated in said a seat in correspondence with said values of said vehicle attitude;

correcting means for correcting said values of motion in said sitting attitude in correspondence with said steering condition of said vehicle; and adjusting means for adjusting said sitting attitude based on said values of motion in said sitting attitude corrected by said correcting means.

* * * * *